(12) United States Patent
Kuwahara et al.

(10) Patent No.: US 8,000,525 B2
(45) Date of Patent: Aug. 16, 2011

(54) IMAGE PROCESSING DEVICE, IMAGE PROCESSING SYSTEM, IMAGE PROCESSING METHOD, IMAGE PROCESSING PROGRAM, AND INTEGRATED CIRCUIT DEVICE

(75) Inventors: Yasuhiro Kuwahara, Osaka (JP); Akio Kojima, Osaka (JP); Haruo Yamashita, Osaka (JP); Takeshi Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 1147 days.

(21) Appl. No.: 10/590,489

(22) PCT Filed: Feb. 22, 2005

(86) PCT No.: PCT/JP2005/002798
§ 371 (c)(1),
(2), (4) Date: Aug. 24, 2006

(87) PCT Pub. No.: WO2005/081187
PCT Pub. Date: Sep. 1, 2005

(65) Prior Publication Data
US 2007/0183656 A1  Aug. 9, 2007

(30) Foreign Application Priority Data
Feb. 25, 2004 (JP) .................................. 2004-048898

(51) Int. Cl.
*G06K 9/00* (2006.01)
(52) U.S. Cl. ...................................................... 382/167
(58) Field of Classification Search .................. None
See application file for complete search history.

(56) References Cited

U.S. PATENT DOCUMENTS

| 5,045,934 A | 9/1991 | Kikuchi |
| 5,333,070 A | 7/1994 | Ichikawa |
| 5,515,449 A | 5/1996 | Tsuruoka et al. |

(Continued)

FOREIGN PATENT DOCUMENTS
EP  1 667 063  6/2006
(Continued)

OTHER PUBLICATIONS

Supplementary European Search Report issued Jan. 29, 2009 in the Application No. EP 05 71 0524.

*Primary Examiner* — Yuzhen Ge
(74) *Attorney, Agent, or Firm* — Wenderoth, Lind & Ponack, L.L.P.

(57) ABSTRACT

An object of the invention is to provide an image processing device with which color processing can be adjusted with ease. An image processing device (10) is provided with a processing degree setting portion (18), a profile creation portion (15), and a color processing execution portion (16). The processing degree setting portion (18) sets a target degree of color processing with regard to at least two properties of a plurality of properties of an image signal (d2), as a single target processing degree (d8). The profile creation portion (15) creates a color transformation profile for performing color processing at the target processing degree (d8), based on the target processing degree (d8) that has been set by the processing degree setting portion (18) and a plurality of base color transformation profiles for performing the color processing to differing degrees. The color processing execution portion (16) performs color processing with respect to the image signal (d2) using the color transformation profile that has been created by the profile creation portion (15).

16 Claims, 22 Drawing Sheets

U.S. PATENT DOCUMENTS

| | | | |
|---|---|---|---|
| 5,754,924 A * | 5/1998 | Yamada | 399/81 |
| 5,956,416 A | 9/1999 | Tsuruoka et al. | |
| 6,535,301 B1 * | 3/2003 | Kuwata et al. | 358/1.9 |
| 6,947,078 B1 * | 9/2005 | Kuwata et al. | 348/223.1 |
| 7,016,075 B1 * | 3/2006 | Tsukada | 358/1.9 |
| 7,256,911 B2 * | 8/2007 | Takabayashi et al. | 358/1.9 |
| 7,394,931 B2 * | 7/2008 | Shimizu | 382/168 |
| 7,403,653 B2 * | 7/2008 | Hirashima et al. | 382/167 |
| 7,471,415 B2 * | 12/2008 | Ito et al. | 358/1.9 |
| 7,583,403 B2 * | 9/2009 | Ito et al. | 358/1.9 |
| 2003/0202194 A1 * | 10/2003 | Torigoe et al. | 358/1.9 |
| 2004/0151370 A1 * | 8/2004 | Sasaki | 382/162 |
| 2004/0227964 A1 * | 11/2004 | Fujino | 358/1.9 |
| 2007/0165048 A1 | 7/2007 | Yamashita et al. | |

FOREIGN PATENT DOCUMENTS

| | | |
|---|---|---|
| JP | 2-268722 | 11/1990 |
| JP | 3-21186 | 1/1991 |
| JP | 3-123274 | 5/1991 |
| JP | 6-121159 | 4/1994 |
| JP | 11-69181 | 3/1999 |
| JP | 2936080 | 6/1999 |
| JP | 2001-298629 | 10/2001 |
| JP | 2005-27161 | 1/2005 |

* cited by examiner

*Fig.15*

| | B | |
|---|---|---|
| C | A | D |
| | E | |

(a)

| F | G | H |
|---|---|---|
| J | A | |
| | | |

(b)

IMAGE PROCESSING DEVICE, IMAGE PROCESSING SYSTEM, IMAGE PROCESSING METHOD, IMAGE PROCESSING PROGRAM, AND INTEGRATED CIRCUIT DEVICE

TECHNICAL FIELD

The present invention relates to image processing devices, and in particular relates to image processing devices that perform color processing of an image signal.

BACKGROUND ART

Color processing is known as a type of image processing for image signals.

Color processing is processing known as display color transformation, color gamut transformation, and memory color correction, for example. Display color transformation is processing for adjusting the overall tone of the image signal, and for example is processing for adjusting the brightness of the image signal or processing for adjusting to give a specific effect to the image signal (such as film-like processing). Color gamut transformation is processing that is performed in order to reproduce and display an image signal in a fixed color space on a device for inputting/outputting image signals, and for example includes processing known as gamut mapping. Memory color correction is processing for adjusting a specific color, such as the color of sky, skin, or green foliage in the image signal, to fit memory.

Image processing devices that independently adjust each one of a plurality of properties of the image signal when executing these color processing operations are known (for example, see Japanese Patent Number 2936080). As shown in FIG. 22, with this image processing device it is possible to independently adjust the hue, vividness and brightness of two specific memory colors. Specifically, with this image processing device, six adjustment knobs are provided, and these are independently actuated to effect color adjustment. In addition to this image processing device, other devices with which the red, green, and blue colors of an image signal can be adjusted independently are known.

DISCLOSURE OF THE INVENTION

However, some users of the image processing device may not wish to independently adjust a plurality of properties of an image signal when performing color processing. This is because to maintain the balance among those properties and at the same time achieve a desired color processing, complicated adjustments must be made for each property. For example, when performing memory color correction of skin tone with an image processing device with which the brightness, vividness, and hue, for example, can be adjusted, if the user would like to change the degree of memory color correction so as to perform memory color correction to a whiter skin tone or to perform memory color correction to obtain a more yellow skin tone, then it is difficult to adjust the balance between the brightness, vividness, and hue, for example, in order to perform the desired memory color correction.

Accordingly, it is an object of the present invention to provide an image processing device with which the color processing can be adjusted with ease.

An image processing device according to a first aspect of the invention is provided with processing degree setting means, processing coefficient group creation means, and color processing execution means. The processing degree setting means sets a target degree of color processing with regard to at least two properties of a plurality of properties of an image signal, as a single target processing degree. The processing coefficient group creation means creates a processing coefficient group for performing the color processing at the target processing degree, based on the target processing degree that is set by the processing degree setting means and a plurality of base coefficient groups that perform the color processing to differing degrees. The color processing execution means performs the color processing with respect to the image signal using the processing coefficient group that is created by the processing coefficient group creation means.

Here, color processing is processing known as display color transformation, color gamut transformation, or memory color correction, for example. The properties of the image signal are parameters of the color space for expressing the image signal, and for example are the parameters of a color space such as RGB, CMYK, YUV, HSB, HSL, CIELuv, or CIELab. The base coefficient groups and processing coefficient group are coefficient groups for performing color processing of the image signal, and for example are coefficient matrices for the image signal or lookup tables for the image signal.

The processing degree setting means sets a target degree for color processing for at least two properties as a single value. That is, with a single value it simultaneously gives a target for color processing for at least two properties. The processing coefficient group creation means creates a processing coefficient group from a plurality of base coefficient groups that perform the color processing at differing degrees, based on the single value that is set. The color processing execution means executes color processing of the image signal using a processing coefficient group that achieves the target degree of color processing.

With this image processing device of the invention, color processing can be performed for at least two properties simultaneously by giving only a single target processing degree. That is, the color processing can be adjusted with greater ease than in a case where color processing is performed independently adjusting each property. A processing coefficient group that is obtained by customizing a plurality of base coefficient groups is used for the color processing. That is, it is possible to achieve color processing in which the degree of color processing that is achieved by a plurality of base coefficient groups is customized.

An image processing device according to a second aspect of the invention is the image processing device according to the first aspect, in which the processing coefficient group creation means creates the processing coefficient group by interpolating or extrapolating the plurality of base coefficient groups based on the target processing degree.

In interpolation or extrapolation, the weighted mean of at least some of the plurality of base coefficient groups is found based on the target processing degree and the degree of color processing achieved by each of the plurality of base coefficient groups. Further, interpolation or extrapolation is performed nonlinearly or linearly with respect to the target processing degree and the degree of color processing achieved by each of the plurality of base coefficient groups.

With this image processing device of the invention, it is possible to achieve color processing that employs a processing coefficient group that is obtained by interpolating or extrapolating a plurality of base coefficient groups.

An image processing device according to a third aspect of the invention is the image processing device according to the first aspect, in which the plurality of properties include a hue, a vividness, and a brightness of the image signal.

In the color processing, at least two of the hue, vividness, and brightness of the image signal are processed simultaneously.

With this image processing device of the invention, the color processing can be adjusted with greater ease than in a case where the color processing is adjusted individually for each property.

An image processing device according to a fourth aspect of the invention is the image processing device according to the first aspect, in which the color processing is memory color correction.

With memory color correction, properties such as the hue and the brightness, or the hue and the vividness, are processed simultaneously.

The processing degree setting means sets a target degree for memory color correction as a single target processing degree. The processing coefficient group creation means creates a processing coefficient group for performing memory color correction at the target processing degree based on the target processing degree that is set and a plurality of base coefficient groups for performing the memory color correction to differing degrees. The color processing execution means performs memory color correction of the image signal using the processing coefficient group that is created.

With this image processing device of the invention, the degree of memory color correction can be adjusted with ease.

An image processing device according to a fifth aspect of the invention is the image processing device according to the fourth aspect, in which the processing degree setting means sets a correction trend of the memory color correction as the target processing degree. Further, the processing coefficient group creation means creates the processing coefficient group by interpolating or extrapolating the plurality of base coefficient groups for performing memory color correction with different correction trends based on the target processing degree.

When the correction trend of the memory color correction is different, the correction target for memory color correction also is different. For example, each of the plurality of base coefficient groups results in memory color correction that leads to a different correction target for the image signal. That is, in each memory color correction there is a different orientation of the vector linking the values of the image signal before and after color processing.

With this image processing device of the invention, the correction trend of the memory color correction can be adjusted with ease.

An image processing device according to a sixth aspect of the invention is the image processing device according to the fourth aspect, in which the processing degree setting means sets a correction strength of the memory color correction as the target processing degree. Furthermore, the processing coefficient group creation means creates the processing coefficient group by interpolating or extrapolating a base coefficient group for performing memory color correction of a predetermined correction strength and a base coefficient group with which memory color correction is not performed, based on the target processing degree.

Here, correction strength is the degree of correction of the image signal toward the correction target. That is, the direction of the vector connecting the values of the image signal before and after memory color correction by the processing coefficient group is substantially the same as the direction of the vector that connects the values of the image signal before and after memory color correction by the base coefficient groups used to create the processing coefficient group.

With this image processing device of the invention, the correction strength of the memory color correction can be adjusted with ease.

An image processing device according to a seventh aspect of the invention is the image processing device according to the first aspect, in which the plurality of base coefficient groups are a plurality of base matrix data whose size corresponds to the number of the plurality of properties of the image signal. Furthermore, the color processing execution means performs a matrix computation on the image signal using the processing matrix data created by the processing coefficient group creation means.

The processing coefficient group creation means creates processing matrix data from a plurality of base matrix data based on the target processing degree. The color processing execution means executes color processing of the image signal using the processing matrix data for achieving the color processing at the target processing degree.

With this image processing device of the invention, processing matrix data obtained by customizing a plurality of base matrix data are used. That is, it is possible to achieve color processing in which the degree of color processing that is achieved by a plurality of base matrix data is customized.

An image processing device according to an eighth aspect of the invention is the image processing device according to the seventh aspect, in which the processing coefficient group creation means creates the processing matrix data by interpolating or extrapolating the base matrix data based on the target processing degree.

In interpolation or extrapolation, the weighted mean of at least some of the plurality of base matrix data is found based on the target processing degree and the degree of color processing achieved by each of the plurality of base matrix data. Further, interpolation or extrapolation is performed nonlinearly or linearly with respect to the target processing degree and each degree of color processing achieved by the plurality of base matrix data.

With this image processing device of the invention, it is possible to achieve color processing that employs processing matrix data that are obtained by interpolating or extrapolating a plurality of base matrix data.

An image processing device according to a ninth aspect of the invention is the image processing device according to the first aspect, in which the plurality of base coefficient groups are a plurality of base lookup tables that store values of the image signal after the color processing that correspond to the values of the image signal. Furthermore, the color processing execution means executes the color processing on the image signal using a processing lookup table that is created by the processing coefficient group creation means.

The processing coefficient group creation means creates a processing lookup table from a plurality of base lookup tables based on the target processing degree. The color processing execution means executes color processing of the image signal using the processing lookup table that achieves the color processing to the target processing degree.

With this image processing device of the invention, a processing lookup table that is obtained by customizing a plurality of base lookup tables is used. That is, it is possible to achieve color processing arrived at by customizing the degree of color processing achieved by a plurality of base lookup tables.

An image processing device according to a tenth aspect of the invention is the image processing device according to the ninth aspect, in which the processing coefficient group creation means creates the processing lookup table by interpolating or extrapolating the base lookup tables based on the target processing degree.

In interpolation or extrapolation, the weighted mean of at least some of the plurality of base lookup tables is found based on the target processing degree and each degree of color processing that is achieved by the plurality of base lookup tables. Further, interpolation or extrapolation is performed nonlinearly or linearly with respect to the target processing degree and each degree of color processing achieved by the plurality of base lookup tables.

With this image processing device of the invention, it is possible to achieve color processing that employs a processing lookup table that is obtained by interpolating or extrapolating a plurality of base lookup tables.

An image processing device according to an eleventh aspect of the invention is the image processing device according to the first aspect, in which the processing degree setting means has first processing degree setting means for setting a first target processing degree, which is a target for a correction trend of memory color correction, and second processing degree setting means for setting a second target processing degree, which is a target for a correction strength of memory color correction. Also, the processing coefficient group creation means creates the processing coefficient group by interpolating or extrapolating the plurality of base coefficient groups for performing memory color correction at different correction trends, based on the first processing degree and the second processing degree.

With the processing degree setting means, the correction trend and the correction strength of the memory color correction are set as a first target processing degree and a second target processing degree. The processing coefficient group creation means creates a processing coefficient group for achieving the correction trend and the correction strength set from the plurality of base coefficient groups. The color processing execution means uses the processing coefficient group that is created to perform color processing of the image signal.

With this image processing device of the invention, it is possible to easily set and achieve memory color correction with a desired degree of correction trend and correction strength.

An image processing device according to a twelfth aspect of the invention is the image processing device according to the first aspect, in which the processing coefficient group creation means creates the processing coefficient group by changing only a specific section of the base coefficient groups.

The processing coefficient group creation means changes only a specific section of the base coefficient groups, and for other sections, for example uses the value of any of the base coefficient groups, to create the processing coefficient group.

With this image processing device of the invention, it is possible to reduce the amount of processing that is performed by the processing coefficient group creation means.

An image processing device according to a thirteenth aspect of the invention is the image processing device according to the twelfth aspect, in which the specific section is a section that is determined by the processing degree setting means.

The processing degree setting means sets a target for color processing. The processing coefficient group creation means then uses this target for color processing to determine the color gamut to be processed, for example, and determine the specific section to be used for color processing of that color gamut.

An image processing device according to a fourteenth aspect of the invention is the image processing device according to the twelfth or thirteenth aspect, in which the specific section is a section of the base coefficient groups that gives a transformation coefficient for a predetermined memory color.

An image processing system according to a fifteenth aspect of the invention includes image processing execution means and display signal creation means. The image processing execution means performs image processing of an image signal and outputs a processed signal. The display signal creation means creates a display signal for displaying the processed signal. The display signal is a signal that is obtained by reprocessing a predetermined region of the processed signal. The predetermined region is a region that is specified by comparing the gradation properties of the image signal and the processed signal.

Here, display is used to mean a display for confirming the image processing that has been performed before the processed signal is output to a monitor or printer, for example, and can be a so-called preview display. The image processing execution means can be an image processing device mentioned in any of the previous aspects.

With the image processing system of the invention, it is possible to create a display signal that clearly indicates the predetermined region that is specified by comparing the gradation properties. Thus, if the processed signal is output to a monitor or a printer, for example, then the portions that may become the cause for an unnatural output can be identified in advance.

An image processing system according to a sixteenth aspect of the invention is the image processing system according to the fifteenth aspect, in which the predetermined region is a region whose gradation order with respect to surrounding regions is different for the image signal and the processed signal.

Here, gradation order refers to the relationship in size among the gradations. That is, the predetermined region is a section whose relationship in size of the gradation with respect to surrounding regions is different before and after image processing.

With this image processing system of the invention, sections whose gradation order is different before and after image processing can be confirmed in advance.

An image processing system according to a seventeenth aspect of the invention is the image processing system according to the fifteenth aspect, in which the reprocessing is processing for transforming a color of the predetermined region.

The processing for transforming a color of the predetermined region is processing for turning the color of the predetermined region into a specific transformation color (such as red, blue, or green) or processing for turning the predetermined region into only its luminance component.

With this image processing system of the invention, the color of a predetermined region that is specified by comparing the gradation properties is transformed before it is displayed, and thus the predetermined region can be confirmed with ease.

An image processing method according to an eighteenth aspect of the invention includes a processing degree setting step, a processing coefficient group creation step, and a color processing execution step. The processing degree setting step sets a target degree of color processing with regard to at least two properties of a plurality of properties of an image signal, as a single target processing degree. The processing coefficient group creation step creates a processing coefficient group for performing color processing at the target processing degree, based on the target processing degree that is set in the processing degree setting step and a plurality of base coefficient groups for performing the color processing to differing degrees. The color processing execution step performs color processing of the image signal using the processing coefficient group that is created in the processing coefficient group creation step.

Here, color processing is processing known as display color transformation, color gamut transformation, or memory color correction, for example. The properties of the image signal are parameters of the color space for expressing the image signal, and for example are the parameters of a color space such as RGB, CMYK, YUV, HSB, HSL, CIELuv, or CIELab.

The processing degree setting step sets a target degree for color processing of at least two properties as a single value. That is, with a single value it simultaneously gives a target for color processing for at least two properties. The processing coefficient group creation step creates a processing coefficient group from a plurality of base coefficient groups that perform the color processing to differing degrees, based on that single value that is set. The color processing execution step executes color processing of the image signal using a processing coefficient group that achieves the target degree of color processing.

With this image processing method of the invention, at least two properties can be color processed simultaneously using only a single target processing degree. That is, color processing can be performed with greater ease than in a case where color processing is performed by independently adjusting each property. Further, a processing coefficient group that is obtained by customizing a plurality of base coefficient groups is used for the color processing. That is, it is possible to achieve color processing that is arrived at by customizing the degree of color processing achieved by a plurality of base coefficient groups.

An image processing program according to a nineteenth aspect of the invention is an image processing program for performing color processing of an image signal through a computer, and causes a computer to perform an image processing method that includes a processing degree setting step, a processing coefficient group creation step, and a color processing execution step. The processing degree setting step sets a target degree of color processing with regard to at least two properties of a plurality of properties of an image signal, as a single target processing degree. The processing coefficient group creation step creates a processing coefficient group for performing the color processing of the target processing degree, based on the target processing degree that is set in the processing degree setting step and a plurality of base coefficient groups for performing the color processing to differing degrees. The color processing execution step performs the color processing with respect to the image signal using the processing coefficient group that is created in the processing coefficient group creation step.

Here, color processing is processing known as display color transformation, color gamut transformation, or memory color correction, for example. The properties of the image signal are parameters of the color space for expressing the image signal, and for example are the parameters of a color space such as RGB, CMYK, YUV, HSB, HSL, CIELuv, or CIELab.

The processing degree setting step sets a target degree of color processing for at least two properties as a single value. That is, with a single value it simultaneously gives a target for color processing for at least two properties. The processing coefficient group creation step creates a processing coefficient group from a plurality of base coefficient groups that perform the color processing to differing degrees, based on that single value that is set. The color processing execution step executes color processing of the image signal using a processing coefficient group that achieves the color processing at the target degree.

With this image processing program of the invention, at least two properties can be color processed simultaneously using only a single target processing degree. That is, color processing can be performed with greater ease than in a case where color processing is performed by independently adjusting each property. Further, a processing coefficient group that is obtained by customizing a plurality of base coefficient groups is used for the color processing. That is, it is possible to achieve color processing that is arrived at by customizing the degree of the color processing that is achieved by a plurality of base coefficient groups.

An integrated circuit device according to a twentieth aspect of the invention includes a processing degree setting portion, a processing coefficient group creation portion, and a color processing execution portion. The processing degree setting portion sets a target degree of color processing with regard to at least two properties of a plurality of properties of an image signal, as a single target processing degree. The processing coefficient group creation portion creates a processing coefficient group for performing the color processing of the target processing degree, based on the target processing degree that is set by the processing degree setting portion and a plurality of base coefficient groups that perform the color processing to differing degrees. The color processing execution portion performs color processing with respect to the image signal using the processing coefficient group that is created by the processing coefficient group creation portion.

Here, color processing is processing known as display color transformation, color gamut transformation, or memory color correction, for example. The properties of the image signal are parameters of the color space for expressing the image signal, and for example are the parameters of a color space such as RGB, CMYK, YUV, HSB, HSL, CIELuv, or CIELab. The base coefficient groups and processing coefficient group are coefficient groups for performing color processing of the image signal, and for example are coefficient matrices for the image signal or lookup tables for the image signal.

The processing degree setting portion sets a target degree of color processing for at least two properties as a single value. That is, with a single value it simultaneously gives a target for color processing for at least two properties. The processing coefficient group creation portion creates a processing coefficient group from a plurality of base coefficient groups that perform the color processing to differing degrees, based on that single value that is set. The color processing execution portion executes color processing of the image signal using a processing coefficient group that achieves the color processing at the target degree.

With this integrated circuit device of the invention, at least two properties can be color processed simultaneously using only a single target processing degree. That is, color processing can be performed with greater ease than in a case where color processing is performed by independently adjusting each property. Further, a processing coefficient group that is obtained by customizing a plurality of base coefficient groups is used for the color processing. That is, it is possible to achieve color processing that is arrived at by customizing the degree of the color processing that is achieved by a plurality of base coefficient groups.

An image processing method according to a twenty-first aspect of the invention includes an image processing execution step of performing image processing of an image signal and outputting a processed signal, and a display signal creation step of creating a display signal for displaying the processed signal. The display signal is a signal that is obtained by reprocessing a predetermined region of the processed signal. The predetermined region is a region that is specified by comparing the gradation properties of the image signal and the processed signal.

Here, display is used to mean a display for confirming the image processing that was performed before the processed signal is output to a monitor or printer, for example, and can be a so-called preview display.

With this image processing method of the invention, it is possible to create a display signal that clearly indicates a predetermined region that is specified by comparing the gradation properties. Thus, if the processed signal is output to a monitor or printer, for example, then the portions that may become a cause for an unnatural output can be identified in advance.

An image processing program according to a twenty-second aspect of the invention is a program for causing a computer to perform an image processing method. The image processing method includes an image processing execution step of performing image processing of an image signal and outputting a processed signal, and a display signal creation step of creating a display signal for displaying the processed signal. The display signal is a signal that is obtained by reprocessing a predetermined region of the processed signal. The predetermined region is a region that is specified by comparing the gradation properties of the image signal and the processed signal.

Here, display is used to mean a display for confirming the image processing that is performed before the processed signal is output to a monitor or printer, for example, and can be a so-called preview display.

With this image processing program of the invention, it is possible to create a display signal that clearly indicates a predetermined region that is specified by comparing the gradation properties. Thus, if the processed signal is output to a monitor or printer, for example, then the portions that may become the cause of an unnatural output can be identified in advance.

An integrated circuit device according to a twenty-third aspect of the invention includes an image processing execution portion for performing image processing of an image signal and outputting a processed signal, and a display signal creation portion for creating a display signal for displaying the processed signal. The display signal is a signal that is obtained by reprocessing a predetermined region of the processed signal. The predetermined region is a region that is specified by comparing the gradation properties of the image signal and the processed signal.

Here, display is used to mean a display for confirming the image processing that is performed before the processed signal is output to a monitor or printer, for example, and can be a so-called preview display. Also, the image processing execution portion can be any image processing device or integrated circuit device recited in previous aspects of the invention.

With this integrated circuit device of the invention, it is possible to create a display signal that clearly indicates a predetermined region that is specified by comparing the gradation properties. Thus, if the processed signal is output to a monitor or a printer, for example, then the portions that may become the cause of an unnatural output can be identified in advance.

By practicing the present invention, it is possible to provide an image processing device that allows the color processing to be adjusted with ease.

BRIEF DESCRIPTION OF DRAWINGS

FIG. 15 is an explanatory diagram for describing the method for detecting the gradation order (seventh embodiment).

BEST MODE FOR CARRYING OUT THE INVENTION

Embodiments of the present invention are described below. In the first through fifth embodiments, an image processing device that employs a lookup table is described. In the sixth embodiment, an image processing device that employs a color transformation matrix is described. In the seventh embodiment, an image processing device that displays a preview when performing color adjustment is described. Additionally, applied examples of the first through seventh embodiments also are described.

First Embodiment

An image processing device 10 that employs a lookup table according to a first embodiment is described using FIGS. 1 to 7. The image processing device 10 is a device that performs visual processing of an image signal as well as color processing of an image signal. The image processing device 10 is provided in a device that handles images, such as a computer, a digital camera, a portable telephone, a PDA, a printer, a scanner, or a digital television.

<Configuration>

Figure 1:
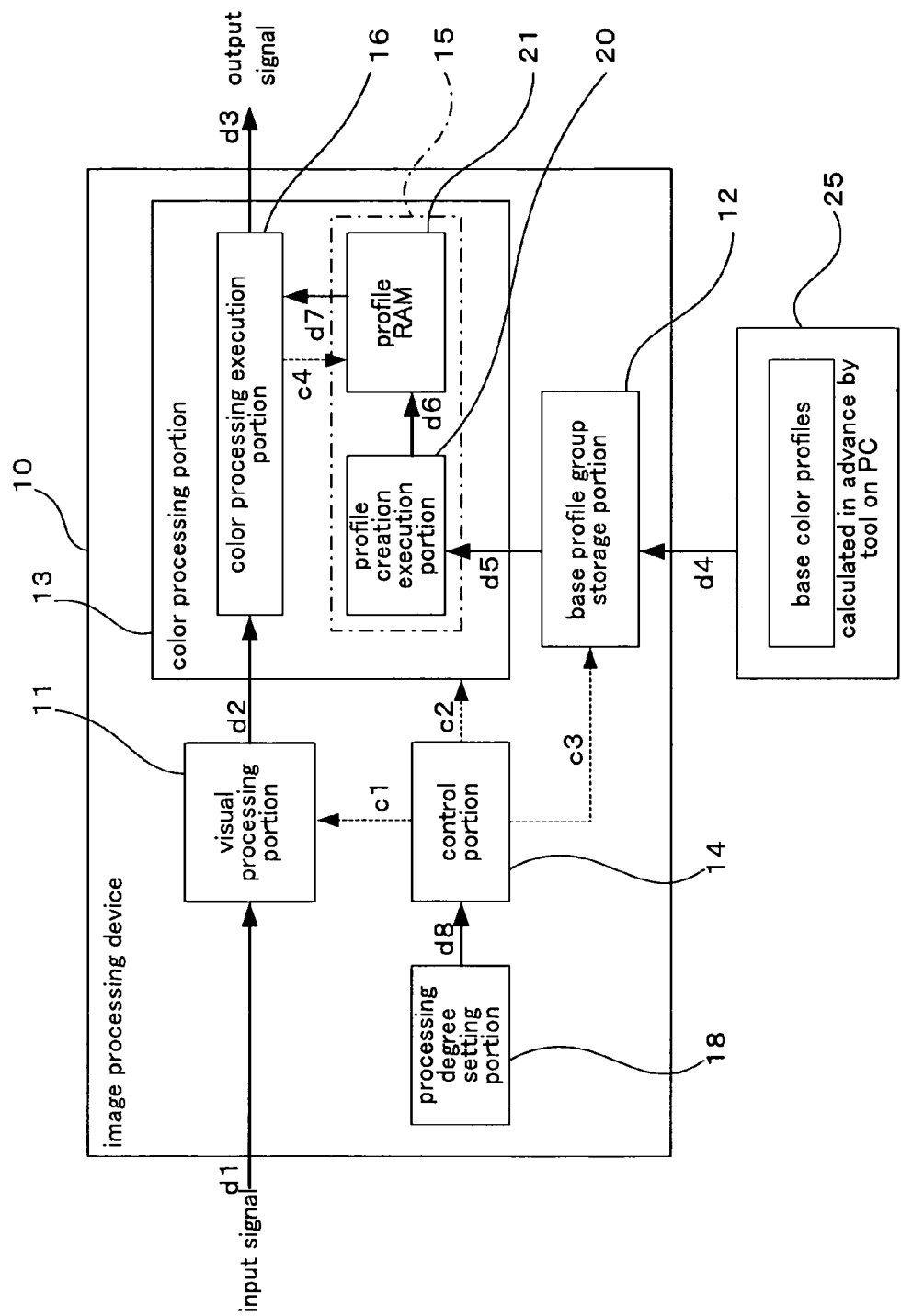
FIG. 1 is a block diagram describing the basic configuration of the image processing device 10 (first embodiment).

The basic configuration of the image processing device 10 is described using FIG. 1. The image processing device 10 is an image processing device that receives an input signal d1 as input and outputs an image-processed output signal d3. The image processing device 10 is provided with a visual processing portion 11 that receives the input signal d1 as input and outputs a visually-processed image signal d2, a base profile group storage portion 12 that stores base color transformation profiles, which serve as the base for color processing, and outputs selected profile data d5, which are the data of a base color transformation profile that has been selected, a color processing portion 13 that receives the image signal d2 and the selected profile data d5 as input and outputs a color-processed output signal d3, a control portion 14 that gives control signals c1 to c3 to these portions, and a processing degree setting portion 18 that sets the degree of color processing by the color processing portion 13.

The visual processing portion 11 receives a control signal c1 from the control portion 14, performs visual processing such as spatial processing or gradation processing on the input signal d1, and outputs the result as the image signal d2. The visual processing portion 11 performs spatial processing through a low-pass spatial filter that permits the passage of only the low frequency space of the input signal d1. As the low-pass spatial filter it is possible to use a FIR (Finite Impulse Responses)-type low-pass spatial filter or an IIR (Infinite Impulse Responses)-type low-pass spatial filter, which are commonly used. The visual processing portion 11 performs gradation processing using a gamma curve, for example.

The base profile group storage portion 12 stores a plurality of base color transformation profiles for achieving any one, or a combination of, color processing such as display color transformation, color gamut transformation, and memory color correction. Each base color transformation profile is stored as a lookup table that lists a mapping from one color space to another color space. More specifically, the lookup tables are stored as three-dimensional lookup tables that list image signal values after color processing (R1, G1, B1) with respect to three-dimensional image signal values (R0, G0, B0) for R (red), G (green), and B (blue). The base color transformation profiles stored on the base profile group storage portion 12 are calculated in advance by a personal computer (PC) 25 that is external to the image processing device. The base color transformation profiles that are calculated are stored on the base profile group storage portion 12 by transferring base profile data d4, which are the data of the base color transformation profiles, from the PC 25.

It should be noted that the base profile group storage portion 12 is constituted by a ROM, a storage medium (e.g. RAM or hard disk) with which overwriting and data updating are possible, or a storage medium (memory card, etc.) that can be removed from the image processing device 10. Base profile data d4 that have been created in advance are read from the PC 25 to the base profile group storage portion 12 of the image processing device 10. If data in the base profile group storage portion 12 can be overwritten or updated, then by connecting the base profile group storage portion 12 to an outside network, the base color transformation profiles can be freely updated from an external member.

The color processing portion 13 includes a profile creation portion 15 that receives the selected profile data d5 as input and outputs profile data for processing d7, and a color processing execution portion 16 that receives the image signal d2 and the profile data for processing d7 as input and outputs an output signal d3. The profile creation portion 15 is made of a profile creation execution portion 20 that receives the selected profile data d5 as input and outputs created profile data d6 that have been created based on the selected profile data, and a profile RAM 21 that stores the created profile data d6 as input, and outputs profile data for processing d7, which are the data to be used for color processing, from the stored data.

The processing degree setting portion 18 allows the user to set a target degree of color processing. The degree of processing that has been set is output as a target processing degree d8.

Figure 2:
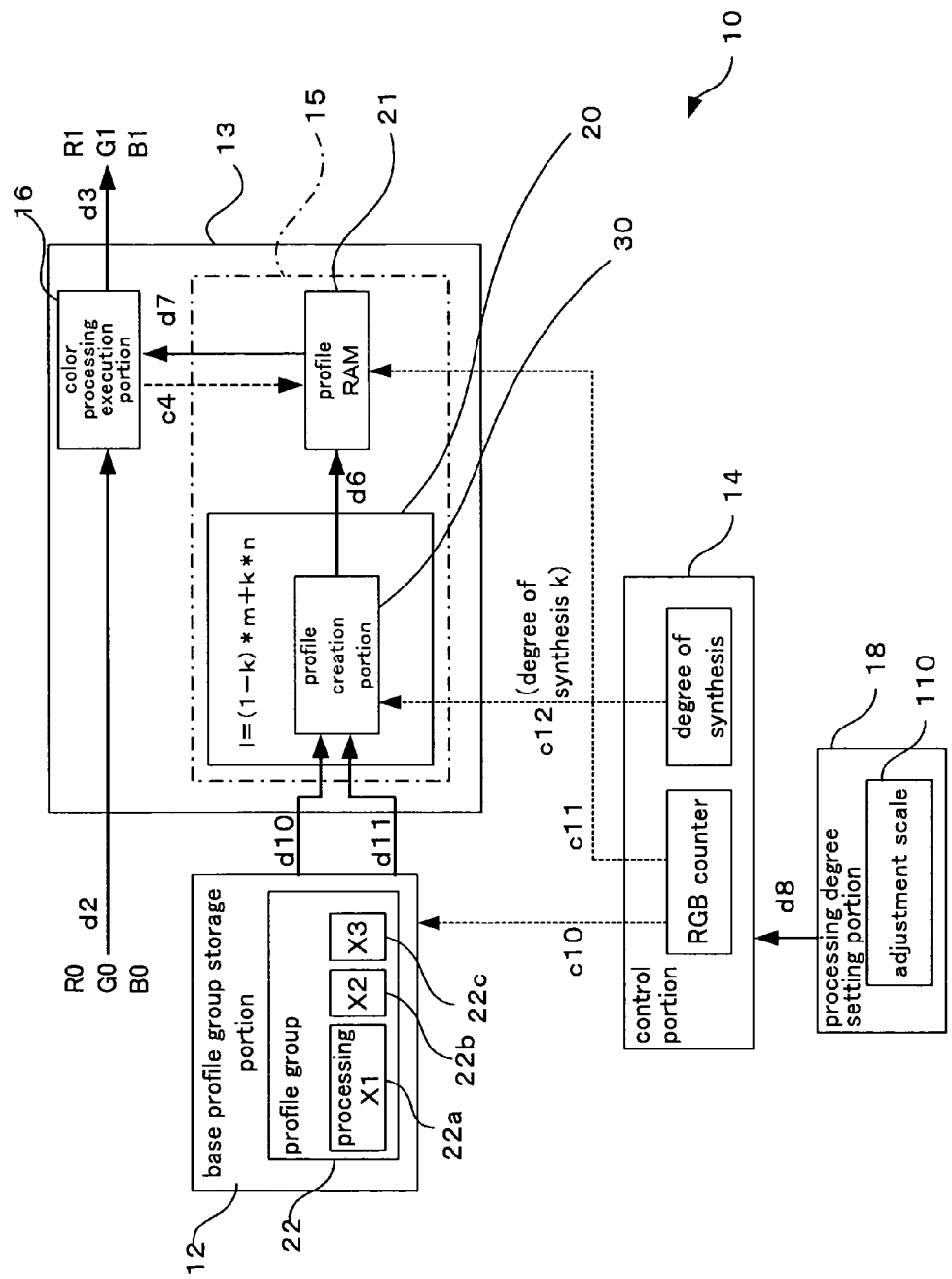
FIG. 2 is a block diagram for describing the specific configuration of the image processing device 10 (first embodiment).
Figure 3:
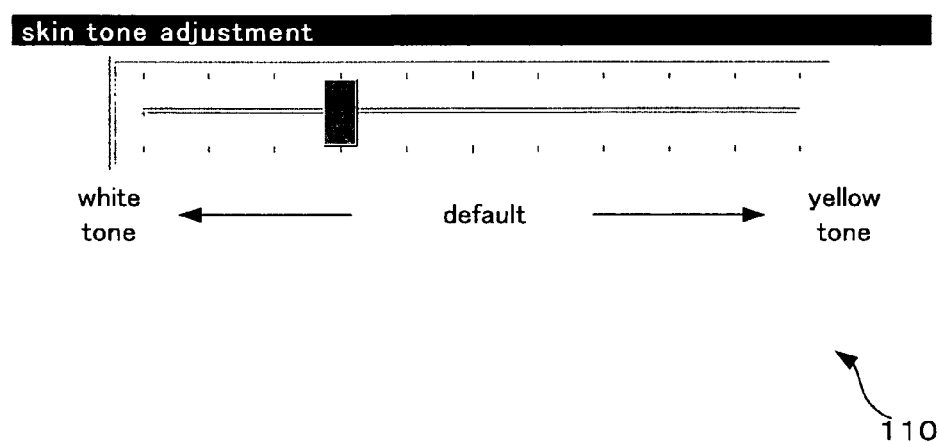
FIG. 3 shows an example of the adjustment scale 110 (first embodiment).

Next, the structures of the base profile group storage portion 12, the color processing portion 13, and the processing degree setting portion 18, which are characteristic portions of the present invention, are described in detail using FIGS. 2 and 3.

(Base Profile Group Storage Portion 12)

The base profile group storage portion 12 stores profile groups each made of a plurality of base color transformation profiles. In the image processing device 10 shown in FIG. 2, it stores a profile group 22 composed of three base color transformation profiles. The profile group 22 is provided with three base color transformation profiles 22a, 22b, and 22c for achieving a processing X1, a processing X2, and a processing X3, which differ in their degree of processing with regard to a processing X.

Here, the processing X is any one color processing of display color transformation, color gamut transformation, and memory color correction, or is color processing that combines display color transformation, color gamut transformation, and memory color correction. Hereinafter, the processing X will be described as memory color correction of skin tone.

<<Profile Groups>>

The profile groups are described. The profile groups are groups made of base color transformation profiles that achieve the same color processing to different degrees. The profile groups have the function of achieving any one color processing of display color transformation, color gamut transformation, and memory color correction, or the function of achieving color processing that combines display color transformation, color gamut transformation, and memory color correction. For example, in the case of the profile group 22, the base color transformation profiles 22a, 22b, and 22c achieve memory color correction of skin tone at different degrees of correction. More specifically, the base color transformation profiles have the same function "memory color correction of skin tone" but achieve different degrees of processing, such as the base color transformation profile 22b achieving the default memory color correction of skin tone, the base color transformation profile 22a transforming the skin tone to a whiter tone, and the base color transformation profile 22c transforming the skin tone to a more yellow tone.

<<Base Color Transformation Profiles>>

The base color transformation profiles are described. The base color transformation profiles are three-dimensional lookup tables that list image signal values after color processing (R1, G1, B1) with respect to three-dimensional image signal values (R0, G0, B0), each of which is expressed by 8 bits. Here, if image signal values after color processing (R1, G1, B1), each of which is expressed by 8 bits, are listed for all of the image signal values prior to color processing (R0, G0, B0), then the base profile group storage portion 12 must have a large storage capacity of $\{(2^{\wedge}8)^{\wedge}3\}*3=48$ Mbytes. Accordingly, image signal values after color processing (R1, G1, B1), each of which is expressed by 8 bits, are listed for only the upper several bits of the image signal values prior to color processing (R0, G0, B0), each of which is expressed by 8 bits. More specifically, if image signal values after color processing (R1, G1, B1) are listed for only the upper five bits of the image signal values prior to color processing (R0, G0, B0), then the storage capacity required for a single base color transformation profile is reduced to $\{(2^{\wedge}5)^{\wedge}3\}*3=98,304$ bytes.

Hereinafter, the base color transformation profiles shall list image signal values after color processing (R1, G1, B1) for only the upper five bits of the image signal values prior to color processing (R0, G0, B0).

(Color Processing Portion 13)

The color processing portion 13 is further provided with a profile creation portion 30 in its profile creation execution portion 20. The profile creation portion 30 receives the selected profile data d5 (see FIG. 1) as input and outputs created profile data d6.

(Processing Degree Setting Portion 18)

The processing degree setting portion 18 allows the user to set a target degree of color processing through a single axis adjustment scale 110.

FIG. 3 shows the adjustment scale 110. The adjustment scale 110 is a sliding bar that is displayed on a display screen, for example, of the image processing device 10, and is for setting the degree of color processing for skin tone. The target for the memory color adjustment to be performed is displayed on the adjustment scale 110. Specifically, the adjustment scale 110 indicates that the skin tone will be memory color corrected to a yellow tone when the sliding bar is set to the right side, and indicates that the skin tone will be memory color corrected to a white tone when the sliding bar is set to the left side.

The target degree of color processing that has been set through the adjustment scale 110 is output to the control portion 14 as a target processing degree d8, which has a value that is associated with the position of the sliding bar. The value 0 is output as the target processing degree d8 if the sliding bar has been set to the center. If the sliding bar is set to the right of center, then the value that is output as the target processing degree d8 is proportional to the distance of the sliding bar from the center, and is greater than "0" but equal to or less than "+1". Similarly, if the sliding bar is set to the left of center, then the value that is output as the target processing degree d8 is proportional to the distance of the sliding bar from the center, and is equal to or greater than "−1" but less than "0".

<Action>

The action of these portions is described using FIG. 2.

(Base Profile Group Storage Portion 12)

A count signal c10 from the control portion 14 is input to the base profile group storage portion 12. The count signal c10 specifies an address of the base profile group storage portion 12 at a fixed count period, allowing the image signal values stored in the specified address to be read out. Specifically, if a color transformation profile for achieving memory color correction of the skin tone is to be created, then the address of the base color transformation profile 22b for achieving the default memory color correction of skin tone, and the base color transformation profile 22a or 22c, in which the degree of color processing for skin tone has been changed, are specified.

Whether the control portion 14 specifies the address of the base color transformation profile 22a or the base color transformation profile 22c is determined by the value of the target processing degree d8 that has been set with the processing degree setting portion 18. Specifically, the address of the base color transformation profile 22c is specified if the target processing degree d8 for the profile group 22 is a positive value, that is, if the sliding bar of the adjustment scale is set to the right of center. The address of the base color transformation profile 22a is specified if the target processing degree d8 for the profile group 22 is a negative value, that is, if the sliding bar of the adjustment scale 110 is set to the left of center. It should be noted that if the sliding bar has been set to the center value, then the address of either one of the base color transformation profile 22a or 22c can be set. Alternatively, it is also possible for neither address to be set, and for the base color transformation profile 22b to be used as it is unchanged.

An address is specified by simultaneously reading out the data associated with the same image signal values (R0, G0, B0) in two base color transformation profiles. The data read out in this manner are output from the base profile group storage portion 12 as first selected profile data d10 and second selected profile data d11. Specifically, the base color transformation profile 22b for achieving the default memory color correction is output as the first selected profile data d10, and the base color transformation profile 22a or 22c is output as the second selected profile data d11. Since the base color transformation profiles 22a to 22c give image signal values after color processing (R1, G1, B1) for only the upper five bits of the image signal values prior to color processing (R0, G0, B0), $(2^{\wedge}5)^{\wedge}3$ addresses are specified for each, and those data are read out.

(Color Processing Portion 13)

<<Profile Creation Portion 30>>

The profile creation portion 30 obtains the first selected profile data d10 and the second selected profile data d11 from the base profile group storage portion 12. It is also given a control signal c12 that specifies the degree of synthesis of the base color transformation profiles 22b and the base color transformation profile 22a or 22c from the control portion 14.

With the control signal c12, the value that is obtained by removing the sign from the value of the target processing degree d8 is given as the value of the degree of synthesis.

The profile creation portion 30 uses the value [k] of the degree of synthesis specified by the control signal c12 to create created profile data d6 having a value [l] from the value [m] of the first selected profile data d10 and the value [n] of the second selected profile data d11. Here, the value [l] is calculated by $[l]=(1-k)*[m]+k*[n]$. That is, if the value [k] is $0 \leq k \leq 1$, then the first selected profile data d10 and the second selected profile data d11 are interpolated.

Figure 4:
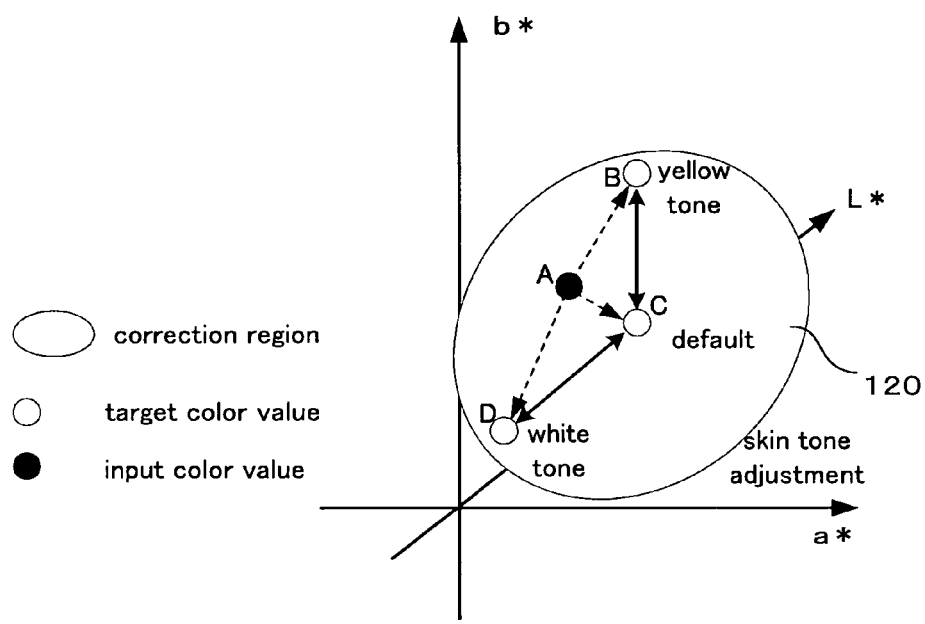
FIG. 4 is an explanatory diagram for describing the correction trend in memory color correction (first embodiment).

Here, FIG. 4 is used to describe the operation of the profile creation portion 30 and the color transformation profile that is created. FIG. 4 is a diagram that shows the correction trend of the memory color correction with respect to a color value A of a skin tone correction region 120 in a Lab space.

The base color transformation profiles 22a to 22c that are used for memory color correction of skin tone transform the color value A as follows. That is, the base color transformation profile 22b for achieving a default memory color correction of skin tone transforms the color value A into a color value C. The base color transformation profile 22a for transforming the skin tone to a whiter tone transforms the color value A into a color value D. The base color transformation profile 22c for transforming the skin tone to a more yellow tone transforms the color value A into a color value B. That is, the base color transformation profiles 22a to 22c differ in the orientation of the vector that links the color values before and after color processing.

When the profile creation portion 30 is given a value for the degree of synthesis, it interpolates the base color transformation profile 22b and either the base color transformation profile 22a or the base color transformation profile 22c, creating a color transformation profile. The color transformation profile that has been created in this manner transforms the color value A into a color value on the line segment BCD. That is, with the profile creation portion 30 it is possible to create a color transformation profile in which the vector linking the specified color values before and after color processing can have any orientation.

It should be noted that in the description of FIG. 4, the term "color value" was used. This does not mean that memory color correction in the present invention changes only the "vividness" and "hue" properties of an image signal. It is also possible for the "brightness" property of an image signal to be changed.

<<Profile RAM 21>>

The profile RAM 21 obtains the created profile data d6 that are created by the profile creation portion 30 and stores them to the addresses specified by the count signal c11 of the control portion 14 (see FIG. 2). Here, the created profile data d6 are associated with the same image signal values (R0, G0, B0) as the first selected profile data d10 or the second selected profile data d11 used to create the created profile data d6.

Thus, a new color transformation profile for realizing a processing Xk that can be any degree of processing is created based on the base color transformation profile for realizing processing X1 through processing X3.

<<Color Processing Execution Portion 16>>

The color processing execution portion 16 obtains the profile data for processing d7, which are the data of the color transformation profile stored in the profile RAM 21, by specifying the corresponding addresses with the count signal c4 in correspondence with the image signal values (R0, G0, B0) of the image signal d2, and with these executes color processing of the image signal d2. Specifically, it reads out the profile data for processing d7 corresponding to the values of the upper 5 bits of the image signal values (R0, G0, B0) of the image signal d2, each of which is expressed by 8 bits. Further, the values of the lower 3 bits of the image signal values (R0, G0, B0) are used to perform a three-dimensional interpolation of the profile data for processing d7 that have been read out, so as to obtain the output signal d3.

<Method>

Figure 5:
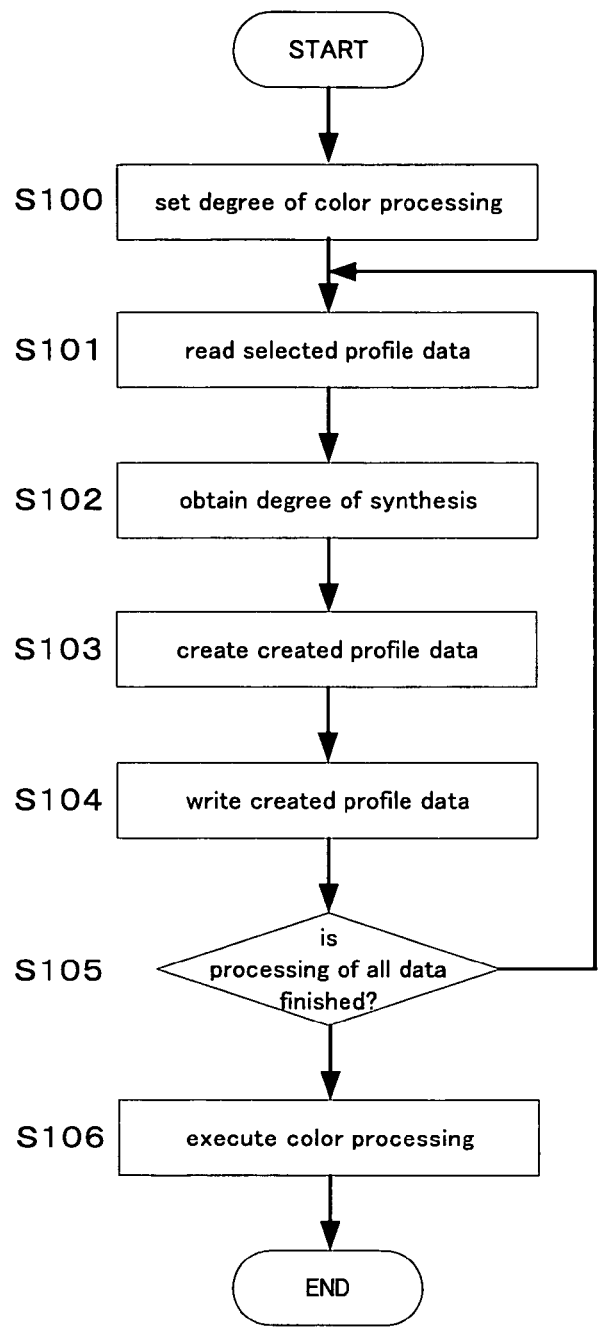
FIG. 5 is a flowchart describing the image processing method (first embodiment).

FIG. 5 is used to describe the image processing method that is executed by the image processing device 10.

The user uses the processing degree setting portion 18 to set a target degree of color processing. The target processing degree d8 that has been set is output to the control portion 14 (step S100).

Addresses of the base profile group storage portion 12 are specified at a fixed count period by the count signal c10 of the control portion 14, and the base profile group storage portion 12 reads out the image signal values stored at the specified addresses (step S101). Specifically, in the case of creating a color transformation profile for achieving the processing X, the addresses of the base color transformation profile 22b and either the base color transformation profile 22a or 22c are specified. The two base color transformation profiles that have been specified are read to the profile creation portion 30 as the first selected profile data d10 and the second selected profile data d11, respectively.

The profile creation portion 30 obtains the control signal c12, which specifies the degree of synthesis, from the control portion 14 (step S102). The relationship between the target processing degree d8 and the control signal c12 was discussed above, and thus will not be described in detail here.

The profile creation portion 30 uses the value [k] of the degree of synthesis specified by the control signal c12 to create created profile data d6 having a value [1] with respect to the value [m] of the first selected profile data d10 and the value [n] of the second selected profile data d11 (step S103). Here, the value [1] is calculated by $[1]=(1-k)*[m]+k*[n]$.

The created profile data d6 are written to the profile RAM 21 (step S104). Here, the addresses to which the created profile data d6 are written are specified by the count signal c11 of the control portion 14 that is given to the profile RAM 21.

The control portion 14 determines whether or not all of the data (R0, G0, B0) of the base color transformation profiles have been processed (step S105), and the processing of step S101 to step S105 is repeated until all data have been processed.

After the new color transformation profile has been stored on the profile RAM 21 in this way, the color processing execution portion 16 performs color processing of the image signal d2 based on the created profile data d6 (step S106).

<Effects>

(1)

With memory color correction, color processing is performed for at least two of the three properties (brightness, vividness, hue) of the image signal d2. The image processing device 10 of the present invention thus can adjust the correction trend for memory color correction of skin tone simply by providing a single target processing degree d8 for each property. That is, memory color correction can be adjusted with greater ease than in a case where each property is adjusted independently to perform memory color correction for each property.

Further, with the image processing device 10 of the present invention it is possible to perform adjustment more quickly than in a case where each property is adjusted independently to perform memory color correction for each property. Thus, adjustments can be carried out appropriately even if the image signal d2 is a moving picture whose scenes change quickly.

(2)

The memory color correction of the invention uses profile data for processing d7 that are a color transformation profile created by customizing a plurality of base color transformation profiles. That is, it is possible to achieve color processing in which the degree of memory color correction that is achieved by the plurality of base color transformation profiles has been customized.

Thus, it is possible to use appropriate base color transformation profiles while achieving a desired degree of memory color correction. That is, the appropriate memory color correction can be adjusted and performed with ease.

When customizing the base color transformation profiles, the base color transformation profiles are interpolated based on the target processing degree d8. Thus, it is possible to create a color transformation profile that achieves appropriate memory color correction that is based on the base color transformation profiles.

(3)

The image processing device 10 can achieve any degree of memory color correction simply by providing the base profile group storage portion 12 with a small number of base color transformation profiles 22a to 22c. For this reason, it is not necessary to prepare any color transformation profiles that have different degrees of processing other than this small number of base color transformation profiles, and this allows the storage capacity of the base profile group storage portion 12 to be reduced.

(4)

The profile creation execution portion 20 arrives at the values of the elements of a new color transformation profile by interpolating or extrapolating corresponding elements in the base color transformation profiles based on the target processing degree d8 that has been set through the processing degree setting portion 18. Thus, new color transformation profiles that achieve a desired degree of processing can be created by freely changing the degree of synthesis of the base color transformation profiles.

(5)

If the base color transformation profiles achieve a combination of a plurality of color processing operations, then the time required for the image processing device 10 to perform a plurality of color processing operations can be shortened compared to a case where the plurality of color processing operations are executed one by one. Further, at least some of the plurality of color processing operations can be executed at a desired degree of processing.

Modified Examples

The invention is not limited to the foregoing embodiment, and various modifications and alterations can be made thereto without departing from the scope of the invention.

(1)

Figure 22:
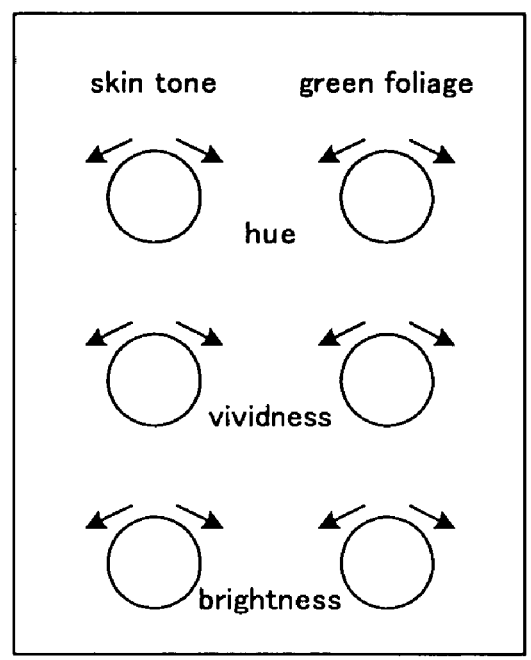
FIG. 22 is a diagram that shows the external appearance of the adjustment knobs (conventional art).

The foregoing embodiment describes a case in which the processing degree setting portion 18 allows the user to set a target degree of color processing through a sliding bar that is displayed on a display screen of the image processing device 10, for example. Here, the processing degree setting portion 18 is not limited to this configuration. For example, it is also possible to achieve a sliding bar through hardware rather than software. Alternatively, it is also possible for the processing degree setting portion 18 to be made of knobs that can be turned to give a target degree of color processing. Specifically, it is possible to provide at least one adjustment knob like that shown as conventional art in FIG. 22, and for the rotation angle of the knob to give the target degree of color processing.

It is also possible to adopt a configuration in which the processing degree setting portion 18 is not provided in a single unit with the image processing device 10. For example, it is also possible for the processing degree setting portion 18 to be connected to the image processing device 10 from the outside. The connection in this case can be through a public line, such as over the Internet, or through a dedicated line.

(2)

In the foregoing embodiment, the processing degree setting portion 18 was described as outputting a target processing degree d8 to the profile group 22 according to the setting of the adjustment scale 110. Here, if the base profile group storage portion 12 has additional profile groups, such as having additional profile groups for performing memory color correction of green foliage or blue sky, then the target processing degree d8 can be provided with a flag that indicates the profile group to which the value to be output corresponds.

In this case, the control portion 14 specifies addresses of the base profile group storage portion 12 using the flag of the target processing degree d8.

It should be noted that the processing degree setting portion 18 can also have a number of adjustment scales that corresponds to the number of profile groups. Further, if the processing degree setting portion 18 has only one adjustment scale, it can have check boxes for indicating which profile group value is to be set.

(3)

In the foregoing embodiment, the value that is output by the processing degree setting portion 18 was described as a value in the range of −1 to +1. Here, the effects of the invention are not limited to this value range. For example, the processing degree setting portion 18 can also output only positive or negative values, such as values from 0 to +1. In this case, the control portion 14 takes the value [+0.5] as the boundary for switching the base color transformation profile to use for interpolation.

It is also possible for the processing degree setting portion 18 to output a value that exceeds the range of −1 to +1. For example, it can also output a value in the range of −1.5 to +1.5. In this case, for values outside the range of −1 to +1, the profile creation portion 30 performs extrapolation of the base color transformation profiles.

Further, in the foregoing embodiment, the value corresponding to the position of the sliding bar was described as being a value that is proportional to the distance from the center of the sliding bar. Here, it is also possible for the value that corresponds with the position of the sliding bar to be a nonlinear value for positions from the center of the sliding bar. In this case, it is for example possible to more finely adjust interpolation, which gives a large weight to the default base color transformation profile.

(4)

In the foregoing embodiment, the processing X was described as memory color correction. Here, the effects of the invention are not limited to the nature of the processing X. That is, the processing X can also be either display color transformation or color gamut transformation, or can be color processing that combines display color transformation, color gamut transformation, and memory color correction.

Memory color correction is not limited to skin tone as described in the foregoing embodiment, and it is also possible for the memory color correction to be performed for green foliage or blue sky, for example. In this case, the profile group for achieving memory color correction for green foliage includes a base color transformation profile that achieves a default memory color correction for green foliage, a base color transformation profile for giving green foliage a yellow tone, and a base color transformation profile for giving green foliage a blue tone. Likewise, the profile group for achieving memory color correction for blue sky includes a base color transformation profile that achieves a default memory color correction for blue sky, a base color transformation profile for giving blue sky a light blue tone, and a base color transformation profile for giving blue sky a red tone.

(5)

The foregoing embodiment describes a case in which the correction trend of memory color correction is set as the target processing degree d8 by the processing degree setting portion 18. That is, the direction of the vectors linking the values of the image signal before and after the color processing that is achieved by the base color transformation profiles is different for each, and the direction of the vectors linking the values of the image signal before and after the color processing achieved by the color transformation profile that has been created can be set to any direction.

Here, it is also possible for the processing degree setting portion 18 to set the correction strength of the memory color correction as the target processing degree d8. This is described using FIG. 6.

Figure 6:
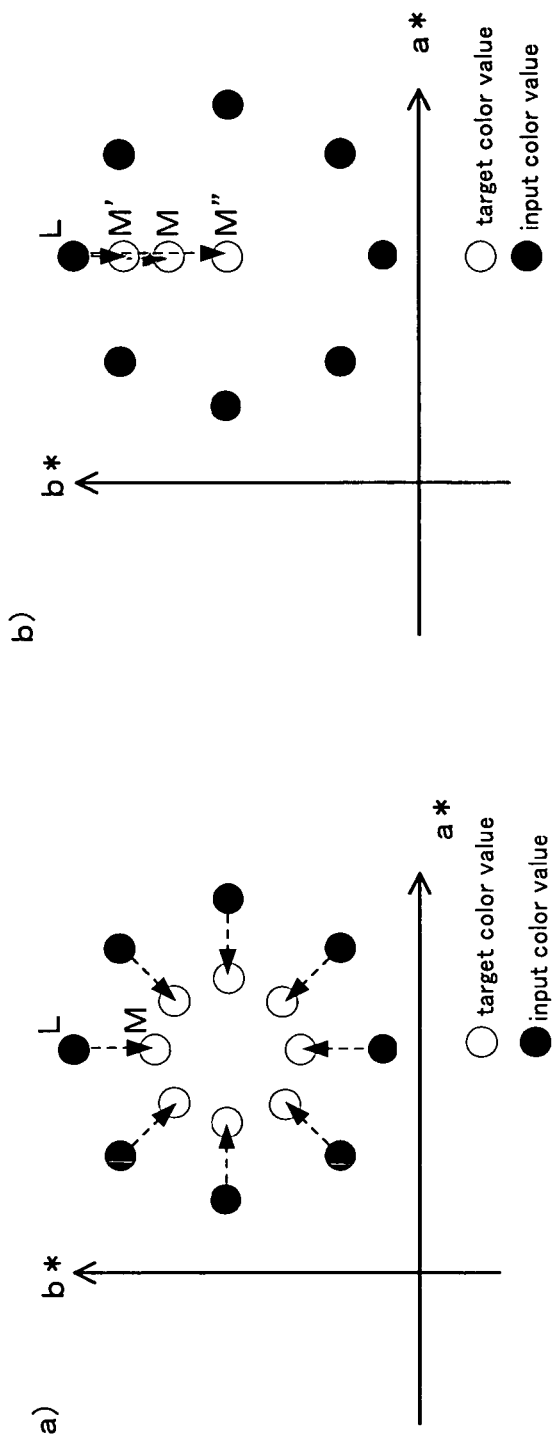
FIG. 6 is an explanatory diagram for describing the correction strength in memory color correction (first embodiment).

FIG. 6(a) shows a state in which the color values are transformed by the base color transformation profile for realizing the default memory color correction. In FIG. 6(*a*), the color value L is converted to the color value M.

FIG. 6(*b*) shows a state in which the color value L is transformed by a color transformation profile that has been created through interpolation or extrapolation of base color transformation profiles. It should be noted that this diagram only shows how the color value L is transformed, but the same applies for the other color values as well.

Specifically, a color transformation profile that achieves memory color correction to a desired correction strength is created by interpolating or extrapolating the base color transformation profile for achieving the default memory color correction and a base color transformation profile for transforming a color value to the same color value (a base color transformation profile with which correction is not performed). With this color transformation profile, the color value L is transformed to the color value M' or the color value M". That is, if interpolation has been performed, then the color value L is transformed to the color value M', and if extrapolation has been performed, then the color value L is transformed to the color value M".

Here, the vector linking the values of the image signal before and after the color processing achieved by the base color transformation profile that achieves the default memory color correction is a vector in the same direction as the vector linking the values of the image signal before and after the color processing achieved by the base color transformation profile that has been created, but they are different in size.

A device for achieving the color processing described in FIG. 6 is described below. It should be noted that portions thereof having the same function as portions of the image processing device 10 described above are assigned the same reference numerals in the following description.

The base color transformation profiles are stored in the base profile group storage portion 12. The profile creation portion 30 obtains the base color transformation profile that transforms the color value to the same color value as first selected profile data d10 and obtains the base color transformation profile that achieves the default memory color correction as the second selected profile data d11. It also obtains the value of the target processing degree d8 as the degree of synthesis, through the control signal c12 from the control portion 14.

The target processing degree d8 is a value of the correction strength that is set by the processing degree setting portion 18. That is, the value of the target processing degree d8 gives the ratio between the size of the vector linking the value of the image signal before and after the color processing that is achieved by the base color transformation profile for achieving the default memory color correction and the size of the vector linking the value of the image signal before and after the color processing that is achieved by the color transformation profile that has been created.

The configuration of the processing degree setting portion 18 is substantially the same as that described in the foregoing embodiment. That is, the processing degree setting portion 18 allows the user to set the correction strength through an adjustment scale that is similar to the one displayed in FIG. 3.

Figure 7:
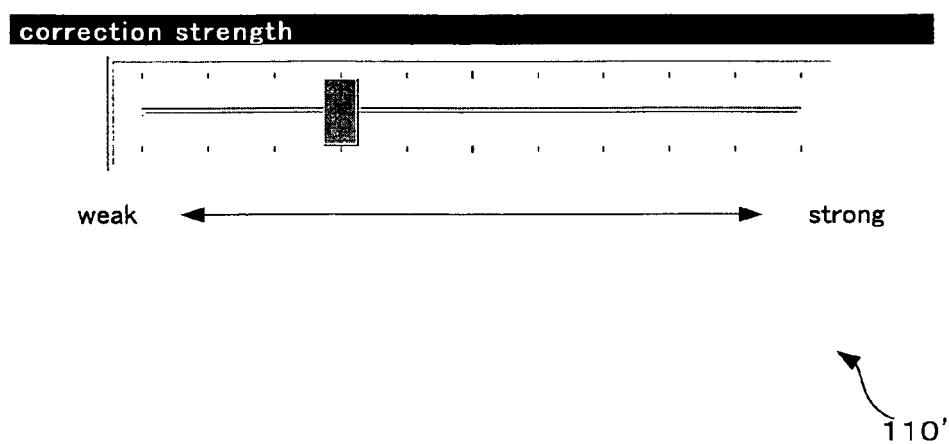
FIG. 7 shows a modified example of the adjustment scale 110 (first embodiment).

As an example, the correction strength is set through an adjustment scale 110' shown in FIG. 7. The adjustment scale 110' is a sliding bar that is displayed on a display screen, for example, of the image processing device 10, and allows a user to set a target for the correction strength. At this time, the processing degree setting portion 18 outputs a target processing degree d8 that has a value that is associated with the position of the sliding bar. The target processing degree d8 is output as the value [1] if the sliding bar has been set to the center. If the sliding bar is set to the right of center, then a value that is proportional to the distance from the center of the sliding bar and greater than [1] but equal to or less than [2] is output. Similarly, if the sliding bar is set to the left of center, then a value that is proportional to the distance from the center of the sliding bar and is equal to or greater than "0" but less than "1" is output.

The profile creation portion 30 uses the value [k] of the degree of synthesis specified by the control signal c12 to create created profile data d6 having a value [1] with respect to the value [m] of the first selected profile data d10 and the value [n] of the second selected profile data d11. Here, the value [1] is calculated by $[1]=(1-k)*[m]+k*[n]$. It should be noted that the value [k] is the same value as the value of the target processing degree d8. If the value [k] is $0 \leq k \leq 1$, then the first selected profile data d10 and the second selected profile data d11 are interpolated, and if the value [k] is k>1, then the first selected profile data d10 and the second selected profile data d11 are extrapolated.

In this way, a color transformation profile that achieves memory color correction having a desired correction strength is created.

It should be noted that the range of the values for the target processing degree d8 described here is only one possibility, and the effects of the invention are not limited to the above case. That is, the target processing degree d8 can be a value that is less than [0] or can be a value that is greater than [2]. In these cases, performing the same calculations as above will lead to a value [1] for the created profile data d6.

(6)

The foregoing embodiment described a case in which color processing is performed for the image signal values (R0, G0, B0) of the image signal d2. Here, the effects of the invention are not limited to this color space. That is, the image signal d2 can also be expressed in a color space such as CMYK, YUV, HSB, HSL, CIELuv, and CIELab. In such a case, base color transformation profiles corresponding to the color space of the image signal d2 are used to create the color transformation profile.

(7)

In the above embodiment, it was described that the profile group 22 is provided with three types of base color transformation profiles. Here, the number of base color transformation profiles that the profile group 22 is provided with is not limited to this. For example, the profile group can also be provided with two types of base color transformation profiles or an even greater number of base color transformation profiles.

If the profile group is provided with two types of base color transformation profiles, then the two types of base color transformation profiles that have been provided are interpolated based on the value of the target processing degree d8 that has been set with the processing degree setting portion 18 in order to create the color transformation profile to use for the color processing. If more base color transformation profiles are provided, then two types of the base color transformation profiles that have been provided are interpolated based on the value of the target processing degree d8 that has been set with the processing degree setting portion 18 in order to create the color transformation profile to use for the color processing.

It was also described that the base profile group storage portion 12 is provided with a profile group 22. Here, the number of profile groups that the base profile group storage portion is provided with is not limited to this. For example, a greater number of profile groups can be provided.

If a greater number of profile groups are provided, then by providing the same number of color processing portions 13 in series, color processing that uses each of those profile groups can be achieved in series. For example, it becomes possible to superimpose memory color correction for each skin tone, green foliage, and blue sky. In this case, the processing degree setting portion 18 allows the degree of processing to be set for each profile group.

(8)

The image processing device 10 was described as being provided with the visual processing portion 11. Here, it is also possible for the image processing device 10 not to be provided with the visual processing portion 11. In this case, the input signal d1 is input directly to the color processing portion 13.

The spatial processing of the visual processing portion 11 can also be performed by calculating the mean value (simple mean or weighted mean) of the target pixel and the surrounding pixels surrounding the target pixel in the input signal d1.

(9)

The processing by the color processing execution portion 16 is not limited to that described in this embodiment. For example, it is also possible to obtain the output signal d3 through a method of interpolating the volume of profile data for processing d7 with respect to the image signal values (R0, G0, B0) of the image signal d2.

(10)

In the foregoing embodiment, it was described that corresponding addresses are specified by the count signal c4 in accordance with the image signal values (R0, G0, B0) of the image signal d2. Here, it is not necessary for the count signal c4 to be given from the color processing execution portion 16. For example, it is also possible for the control portion 14 to specify addresses of the profile RAM 21 in accordance with the image signal values (R0, G0, B0) of the image signal d2.

(11)

In the foregoing embodiment, it was described that the profile creation portion 30 obtains the first selected profile data d10 and the second selected profile data d11 and interpolates (extrapolates) those values to create a new color transformation profile.

Here, when interpolating (extrapolating) the profile data, it is also possible for only data of specific portions, of the data included in the profile data, to be interpolated (extrapolated). Here, "data of specific portions" is used to mean some of the profile data of a lookup table, for example, and specifically means the data obtained from a specific address of the base profile group storage portion 12 or the data stored at a specific address in the profile RAM, for example.

The profile creation portion 30 obtains the first selected profile data d10 and the second selected profile data d11 one at a time. At this time, the profile creation portion 30 determines whether or not the data are data that have been obtained from a specific address of the base profile group storage portion 12. If the result of this determination is yes, then the profile creation portion 30 interpolates (extrapolates) those profile data to create created profile data d6. Conversely, if the result of this determination is no, then the profile creation portion 30 outputs the data of a predetermined profile data of those profile data as the created profile data d6. For example, if the result of the determination is no, then the profile creation portion 30 outputs the data of the first selected profile data d10 as the created profile data d6.

Here, the specific portion is set by the processing degree setting portion 18. For example, if the target processing degree d8 that has been output from the processing degree setting portion 18 includes a flag that indicates which profile group the value is associated with, that is, if the target processing degree d8 makes it possible to identify the color gamut to be subject to color correction through memory color correction, for example, then of the profile data, only those sections that are characteristic for that color correction are changed.

The manner in which specific portions are set is described in more specific detail below.

For example, if an adjustment scale is provided for each color to be color corrected, then the adjustment scale for adjusting skin tone is changed. In this case, the first selected profile data d10 and the second selected profile data d11 for adjusting skin tone are read out sequentially from the base profile group storage portion 12. The processing degree setting portion 18 sets the addresses of sections that are characteristic for color transformation of skin tone in the profile data, to the profile creation portion 30. This setting is performed through the control portion 14.

In this way, by changing only specific portions of the profile data, it is possible to reduce the amount of computation necessary to create a profile.

Second Embodiment

An image processing device 26, which employs a lookup table, according to the second embodiment is described. The image processing device 26 is a device that performs visual processing of an image signal as well as color processing of an image signal. The image processing device 26 is provided in a device that handles images, such as a computer, a digital camera, a portable telephone, a PDA, a printer, a scanner, or a digital television.

Figure 8:
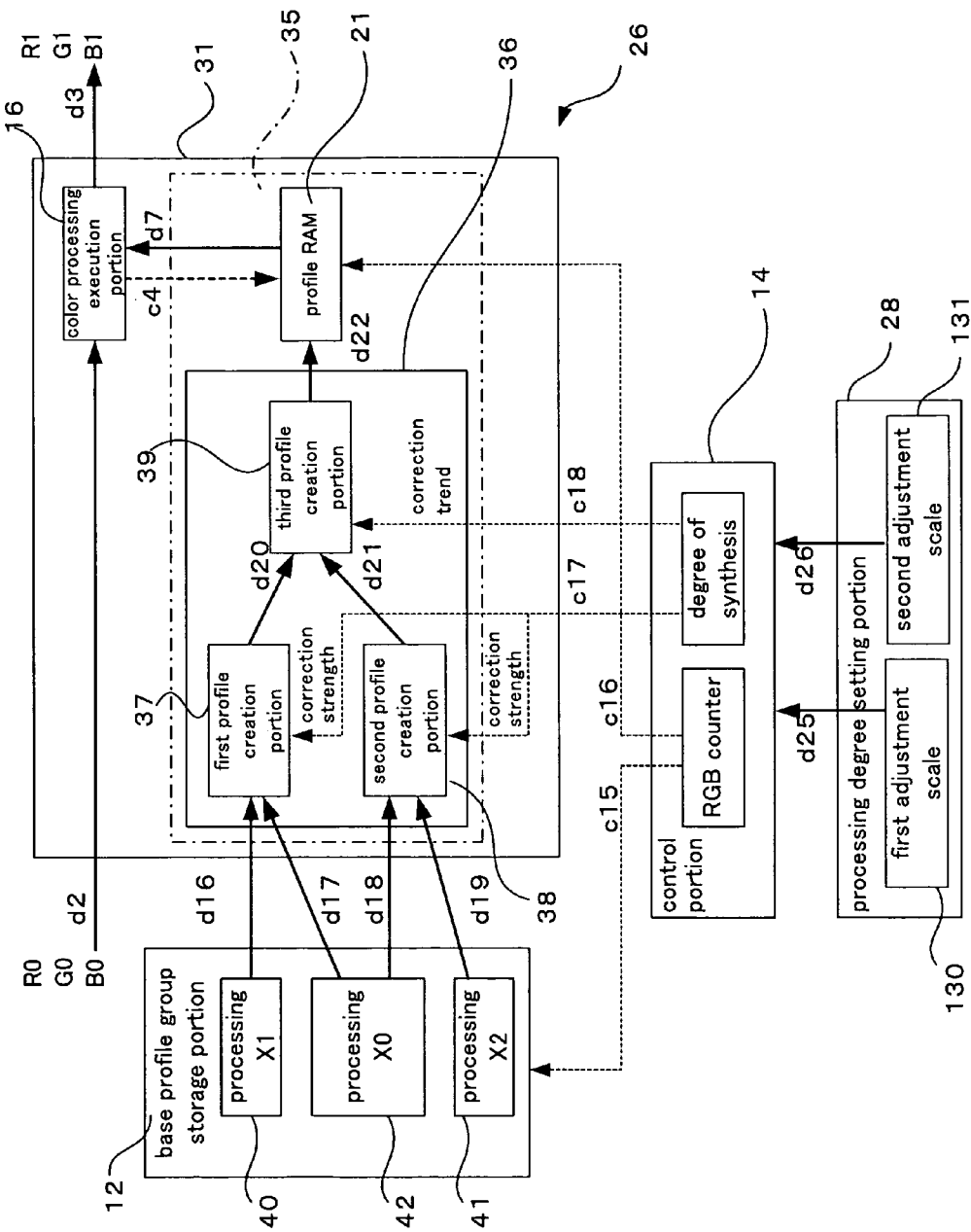
FIG. 8 is a block diagram for describing the specific configuration of the image processing device 26 (second embodiment).

FIG. 8 is a block diagram describing the characteristic portions of the image processing device 26. The image processing device 26 is characterized in that color processing by the color processing portion 31 is achieved by executing a plurality of color processing operations in a superimposed manner, and in that the degree of processing for each of these color processing operations can be adjusted.

The following is a description of the color processing portion 31, a processing degree setting portion 28 that allows the degree of color processing by the color processing portion 31 to be set through the control portion 14, and the base color transformation profiles provided in the base profile group storage portion 12, which are characteristic portions of the image processing device 26. It should be noted that portions that achieve the same function as portions already described in the first embodiment have been assigned the same reference numerals as in the first embodiment and are not be described here.

<Configuration>

(Base Profile Group Storage Portion 12)

The base profile group storage portion 12 stores a plurality of base color transformation profiles. The base profile group storage portion 12 shown in FIG. 8 stores the base color transformation profiles 40 to 42. The base color transformation profiles 40 to 42 are profiles for achieving memory color correction of skin tone. More specifically, the base color transformation profile 40 is a profile for achieving memory color correction toward a yellow skin tone, the base color transformation profile 41 is a profile for achieving memory color correction toward a white skin tone, and the base color transformation profile 42 is a profile with which memory color correction is not performed.

(Color Processing Portion 31)

The color processing portion 31 differs from the color processing portion 13 described using FIG. 2 in the structure of its profile creation portion 35. More specifically, the profile creation portion 35 differs from the profile creation portion 15 described using FIG. 2 in that the profile creation execution portion 36 that the profile creation portion 35 is provided with has three profile creation portions 37 to 39.

The first profile creation portion 37 receives first selected profile data d16 and second selected profile data d17 as input and outputs first created profile data d20. The first selected profile data d16 are the data of the base color transformation profile 40. The second selected profile data d17 are the data of the base color transformation profile 42.

The second profile creation portion 38 receives third selected profile data d18 and fourth selected profile data d19 as input and outputs second created profile data d21. The third selected profile data d18 are the data of the base color transformation profile 42. The fourth selected profile data d19 are the data of the base color transformation profile 41.

The third profile creation portion 39 receives the first created profile data d20 and the second created profile data d21 as input and outputs third created profile data d22.

(Processing Degree Setting Portion 28)

The processing degree setting portion 28 allows the user to set a target degree of color processing through a single axis adjustment scale. The adjustment scale is a sliding bar that is displayed on a display screen, for example, of the image processing device 26, through which the degree of color processing is set. The adjustment scale is the same as that described in the first embodiment using FIG. 3, except that here a first adjustment scale 130 for adjusting the correction strength of the memory color correction and a second adjustment scale 131 for adjusting the correction trend of the memory color correction are provided. The first adjustment scale 130 outputs a first target processing degree d25 through the same operation as that of the adjustment scale described in [First Embodiment] <Modified Examples> (5). The second adjustment scale 131 outputs a second target processing degree d26 through the same operation as that of the adjustment scale 110 described in the first embodiment.

<Action>

(Base Profile Group Storage Portion 12)

A count signal c15 from the control portion 14 is input to the base profile group storage portion 12. The count signal c15 specifies addresses of the base profile group storage portion 12 at a fixed count period, allowing the image signal values stored in the specified addresses to be read out. Specifically, data associated with the same image signal values (R0, G0, B0) in the base color transformation profiles 40 to 42 are read out simultaneously.

(Color Processing Portion 31)

<<Profile Creation Execution Portion 36>>

The first profile creation portion 37 uses the degree of synthesis specified by the control signal c17 to create first created profile data d20 from the first selected profile data d16 and the second selected profile data d17. The pertinent details are identical to those described in [First Embodiment] <Modified Examples> (5). Here, the degree of synthesis that is specified by the control signal c17 is given as the same value as the value of the first target processing degree d25.

The second profile creation portion 38 uses the degree of synthesis specified by the control signal c17 to create second created profile data d21 from the third selected profile data d18 and the fourth selected profile data d19. The pertinent details are identical to those described in [First Embodiment] <Modified Examples> (5). Here, the degree of synthesis that is specified by the control signal c17 is given is as the same value as the value of the first target processing degree d25.

As a consequence, two color transformation profiles in which the correction strength of the memory color correction in the base color transformation profile 40 and the base color transformation profile 41 is changed by the same ratio are created.

The third profile creation portion 39 uses the degree of synthesis specified by a control signal c18 to create third created profile data d22 from the first created profile data d20 and the second created profile data d21. The pertinent details of this operation are substantially the same as those described with respect to the profile creation portion 30 in the first embodiment, where the value [k] of the degree of synthesis specified by the control signal c18 is used to create the third created profile data d22, which has the value [1], from the value [m] of the first created profile data d20 and the value [n] of the second created profile data d21. Here, the value [1] is calculated by $[1]=(1-k)*[m]+k*[n]$. That is, if the value [k] is $0 \leq k \leq 1$, then the first created profile data d20 and the second created profile data d21 are interpolated. The degree of synthesis that is specified by the control signal c18 is given as the same value as the second target processing degree d26.

<<Profile RAM 21>>

The profile RAM 21 obtains the third created profile data d22 that is created by the third profile creation portion 39 and stores these in the addresses specified by the count signal c16 of the control portion 14. Here, the third created profile data d22 are associated with the same image signal values (R0, G0, B0) as the first selected profile data d16 through the fourth selected profile data d19 that were used to create the third created profile data d22.

As a result, a new color transformation profile that achieves a desired correction strength and a desired correction trend for memory color correction is created.

<Effect>

The second embodiment obtains the following effects in addition to the effects described in the first embodiment.

(1)

In memory color correction, color processing is performed for at least two of the three properties (brightness, vividness, hue) of the image signal d2. With the image processing device 26, it is possible to perform memory color correction in which the correction strength and the correction trend are adjusted freely. Further, these can be adjusted with ease by operating a single axis adjustment scale.

Modified Examples (1)

In the foregoing embodiment, the function of the base color transformation profiles 40 to 42 was limited to memory color correction. However, it is also possible for those base color transformation profiles to be profiles that achieve other color processing. For example, the base profile group storage portion 12 can have color transformation profiles for simultaneously achieving two different color processing operations X and Y. More specifically, the base profile group storage portion 12 can have four types of base color transformation profiles for achieving processing that combines a processing X1 and a processing X2, which have different degrees of processing with regard to the processing X, and processing Y1 and a processing Y2, which have different degrees of processing with regard to the processing Y.

In this case, the processing degree setting portion 18 allows the degree of color processing of these color processing operations to be set.

It should be noted that the processing X and the processing Y each are any one color processing of display color transformation, color gamut transformation, and memory color correction, for example.

In this case, it is also possible for the base profile group storage portion 12 not to be provided with only four types of base color transformation profiles. That is, the base profile group storage portion 12 can also be provided with an additional number of base color transformation profiles.

Third Embodiment

An image processing device 45 that uses a lookup table according to a third embodiment is described. The image processing device 45 is a device that performs visual processing of an image signal as well as color processing of an image signal. The image processing device 45 is provided in a device that handles images, such as a computer, a digital camera, a portable telephone, a PDA, a printer, a scanner, or a digital television.

Figure 9:
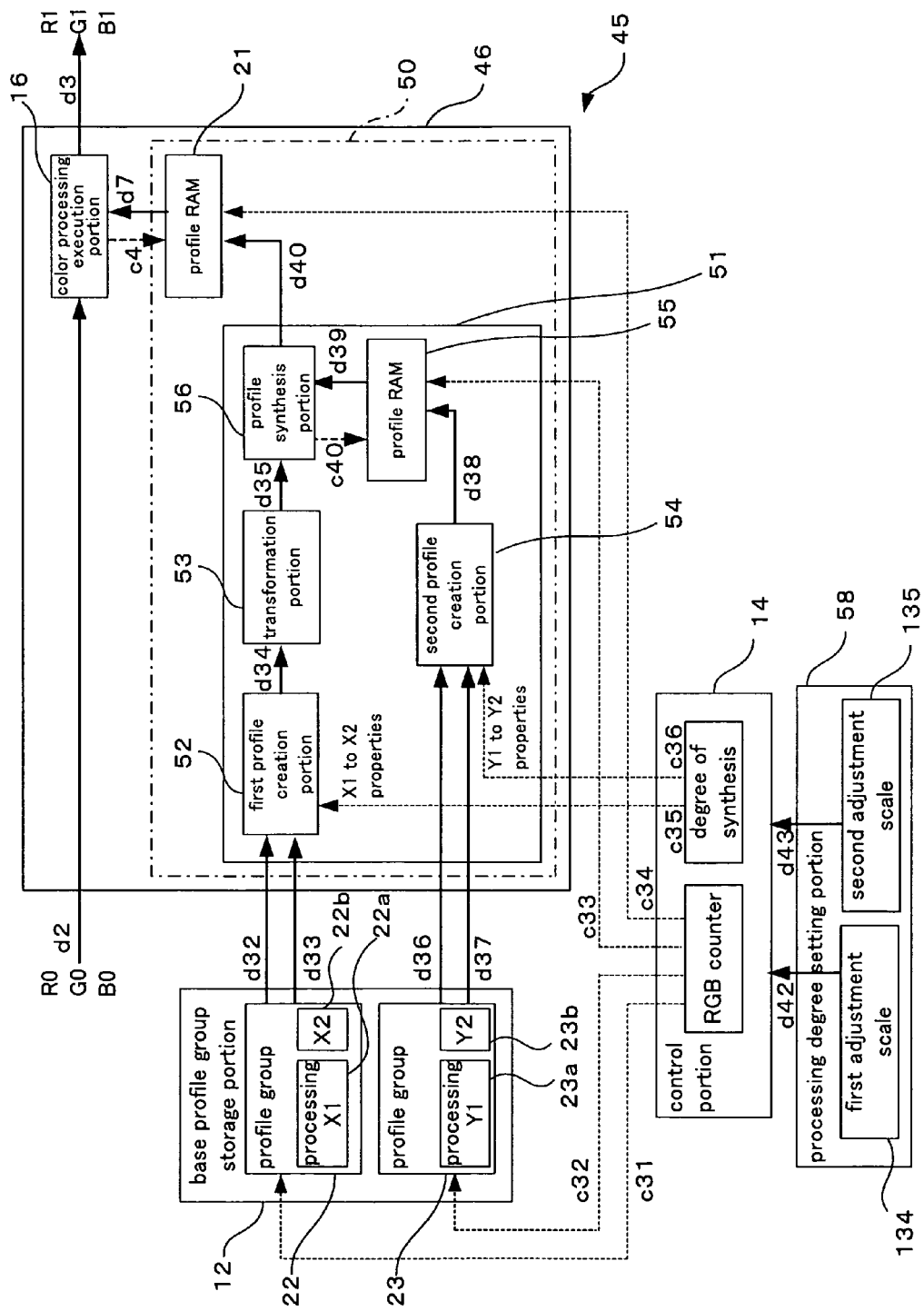
FIG. 9 is a block diagram for describing the specific configuration of the image processing device 45 (third embodiment).

FIG. 9 is a block diagram describing the characteristic portions of the image processing device 45. The image processing device 45, like the image processing device 26 according to the second embodiment, is characterized in that the color processing portion 46 achieves color processing by executing a plurality of color processing operations in a superimposed manner, and in that it is possible to adjust the degree of processing for each of these color processing operations.

Additionally, the image processing device 45 is characterized in that it creates new color transformation profiles by synthesizing a plurality of color transformation profiles that have been created from base color transformation profiles.

The following is a description of the color processing portion 46 and the base color transformation profiles provided in the base profile group storage portion 12, which are characteristic portions of the image processing device 45. It should be noted that a processing degree setting means 58 for adjusting the degree of processing of each of the color processing operations is substantially the same as the processing degree setting means 18 that was described in the first embodiment and its modified examples, and thus will not be described in detail. It should also be noted that portions that achieve the same functions as those already described in the first embodiment have been assigned the same reference numerals as in the first embodiment and will be not be described.

<Configuration>

(Base Profile Group Storage Portion 12)

The base profile group storage portion 12 stores two profile groups 22 and 23, each of which is made of two base color transformation profiles. The profile group 22 is provided with two base color transformation profiles 22a and 22b for performing a processing X1 and a processing X2, which achieve a processing X to different degrees of processing. The profile group 23 is provided with two base color transformation profiles 23a and 23b for performing a processing Y1 and a processing Y2, which achieve a processing Y to different degrees of processing.

Here, the processing X and the processing Y are any one color processing of display color transformation, color gamut transformation, and memory color correction, or are color processing that combines display color transformation, color gamut transformation, and memory color correction. The profile groups and the base color transformation profiles are the same as those described in the first embodiment.

(Color Processing Portion 46)

The color processing portion 46 differs from the color processing portion 13 that was described using FIG. 2 in the structure of its profile creation portion 50. More specifically, it differs in the structure of the profile creation execution portion 51 of the profile creation portion 50.

The profile creation execution portion 51 has a first profile creation portion 52, a transformation portion 53, a second profile creation portion 54, a profile RAM 55, and a profile synthesis portion 56.

The first profile creation portion 52 receives first selected profile data d32 and second selected profile data d33 as input and outputs first created profile data d34. The first selected profile data d32 are the data of the base color transformation profile 22a for achieving the processing X1. The second selected profile data d33 are the data of the base color transformation profile 22b for achieving the processing X2.

The transformation portion 53 receives the first created profile data d34 as input, and outputs transformed profile data d35 that it obtains by executing transformation such as gamma correction with respect to the first created profile data d34.

The second profile creation portion 54 receives third selected profile data d36 and fourth selected profile data d37 as input and outputs second created profile data d38. The third selected profile data d36 are data of the base color transformation profile 23a for achieving the processing Y1. The fourth selected profile data d37 are the data of the base color transformation profile 23b for achieving the processing Y2.

The profile RAM 55 inputs the second created profile data d38 and outputs profile data for synthesis d39.

The profile synthesis portion 56 receives the transformed profile data d35 and the profile data for synthesis d39 and outputs third created profile data d40.

(Processing Degree Setting Portion 58)

The processing degree setting portion 58 allows the user to set a target degree of color processing through a single axis adjustment scale. The adjustment scale is a sliding bar, displayed on a display screen, for example, of the image processing device 45, through which the degree of color processing is set.

The adjustment scale is the same as that described in the first embodiment using FIG. 3, except that here a first adjustment scale 134 for setting the degree of synthesis for the first profile creation portion 52 and a second adjustment scale 135 for setting the degree of synthesis for the second profile creation portion 54 are provided. The first adjustment scale 134 and the second adjustment scale 135 output a first target processing degree d42 and a second target processing degree d43 to the control portion 14 through the same operation as that of the adjustment scale described in the first embodiment or in [First Embodiment] <Modified Examples> (5).

The control portion 14 outputs a control signal c35 and a control signal c36 for specifying a degree of profile synthesis to the first profile creation portion 52 and the second profile creation portion 54 based on the first target processing degree d42 and the second target processing degree d43 that have been obtained.

Here, the relationship between the target processing degree values and the control signal values is the same as the relationship described in the first embodiment or in [First Embodiment] <Modified Examples> (5).

It should be noted that the range of the target processing degree values and the range of the control signal values are determined in accordance with the nature of the processing of the profile groups of the base profile group 12.

<Action>

(Base Profile Group Storage Portion 12)

The base profile group storage portion 12 receives the count signals c31 and c32 that are input from the control portion 14. The count signals c31 and c32 specify addresses of the base profile group storage portion 12 at a fixed count period, allowing the image signal values stored in the specified addresses to be read out. Specifically, due to the count signal c31, the data associated with the same image signal values (R0, G0, B0) in the base color transformation profiles 22a and 22b are read out simultaneously. Also, due to the count signal c32, the data associated with the same image signal values (R0, G0, B0) in the base color transformation profiles 23a and 23b are read out simultaneously.

(Color Processing Portion 46)

<<Profile Creation Execution Portion 51>>

The first profile creation portion 52 uses the degree of synthesis specified by the control signal c35 to create the first created profile data d34 from the first selected profile data d32 and the second selected profile data d33. The pertinent details of this are identical to those of the profile creation portion 30 described in the first embodiment.

As a consequence, a color transformation profile that achieves a processing Xi is created. Here, [i] is the value of the degree of synthesis specified by the control signal c35.

The transformation portion 53 performs a transformation such as gamma correction on the first created profile data d34 and outputs the result as transformed profile data d35.

The second profile creation portion 54, like the first profile creation portion 52, uses the degree of synthesis specified by a control signal c36 to create second created profile data d38 from the third selected profile data d36 and the fourth selected profile data d37.

Thus, a color transformation profile that achieves a processing Yj is created. Here, [j] is the value of the degree of synthesis specified by the control signal c36.

The profile RAM 55 obtains the second created profile data d38 that are created by the second profile creation portion 54, and stores them at the address specified by the count signal c33 of the control portion 14. Here, the second created profile data d38 are associated with the same image signal values (R0, G0, B0) as the third selected profile data d36 and the fourth selected profile data d37 used to create the second created profile data d38.

Thus, the color transformation profile for achieving the processing Yj is stored in the profile RAM 55.

The profile synthesis portion 56 calculates the third created profile data d40 based on the values of the transformed profile data d35. Specifically, the values of the color transformation profile stored in the profile RAM 55 associated with the values of the transformed profile data d35 are output as the third created profile data d40. That is, the profile synthesis portion 56 executes the same operation as the color processing execution portion 16 on the values of the transformed profile data d35. More specifically, the profile synthesis portion 56 uses the count signal c40 to specify an address in the profile RAM 55 in accordance with the values of the transformed profile data d35. The data stored at the specified address are then output as the profile data for synthesis d39. The profile data for synthesis d39 that are output are interpolated in correspondence with the values of the transformed profile data d35, and the result is output as the created profile data d40.

Thus, a new color transformation profile that achieves a desired degree of synthesis for the processing X and the processing Y is created.

<<Profile RAM 21>>

The profile RAM 21 obtains the third created profile data d40 and stores the data in the address specified by the count signal c34 of the control portion 14. Here, the third created profile data d40 are associated with the same image signal values (R0, G0, B0) as the first selected profile data d32 and the second selected profile data d33 used to create the third created profile data d40.

In this way, a new color transformation profile that achieves a desired degree of synthesis with regard to the processing X and the processing Y is stored in the profile RAM 21.

<Effects>

The third embodiment obtains the following effects in addition to the effects described in the first embodiment and the second embodiment.

(1)

In the image processing device 45, if the profile group 22 or 23 is provided with additional base color transformation profiles, the amount that the storage capacity of the base profile group storage portion 12 must be increased is identical to the amount of data of the additional base color transformation profile(s). That is, in a case where the profile groups 22 and 23 each include three base color transformation profiles that achieve different degrees of processing, then it is sufficient for the image processing device 45 to have enough storage capacity for six base color transformation profiles.

On the other hand, in the case of the image processing device 26 described in [Second Embodiment] <Modified Examples> (1), a storage capacity of 3*3=9 base color transformation profiles is necessary.

In this regard, the image processing device 45 can be said to achieve the effect of reducing storage capacity.

(2)

In the image processing device 45, it is necessary to process the image signal d2 in real-time for only the color processing execution portion 16. Thus, color processing that has better real-time properties than if the image signal d2 is subjected to a plurality of color processing operations performed one after the other can be achieved.

Modified Examples (1)

It is not necessary for the profile RAM 55 and the profile RAM 21 to be physically separate from one another. That is, the two can be different regions on the same RAM.

(2)

It is not absolutely necessary to provide the transformation portion 53. It is also possible for the transformation portion 53 to be a processing operation that has been incorporated into the base color transformation profiles in advance.

(3)

This embodiment describes a case in which the base profile group storage portion 12 is provided with two profile groups 22 and 23. Here, the invention can be expanded to include implementations having a greater number of profile groups. For example, it can be appreciated that the invention can be expanded to include a case in which there are three profile groups by providing an additional third profile creation portion and an additional structure that is identical to the profile creation execution portion 51.

In this case, the processing degree setting portion 58 will have additional adjustment scales.

By doing this, color processing that combines an even greater variety of color processing operations can be achieved.

Fourth Embodiment

An image processing device 60, which employs a lookup table, according to a fourth embodiment is described. The image processing device 60 is a device that performs visual processing of an image signal as well as color processing of an image signal. The image processing device 60 is provided in a device that handles images, such as a computer, a digital camera, a portable telephone, a PDA, a printer, a scanner, or a digital television.

Figure 10:
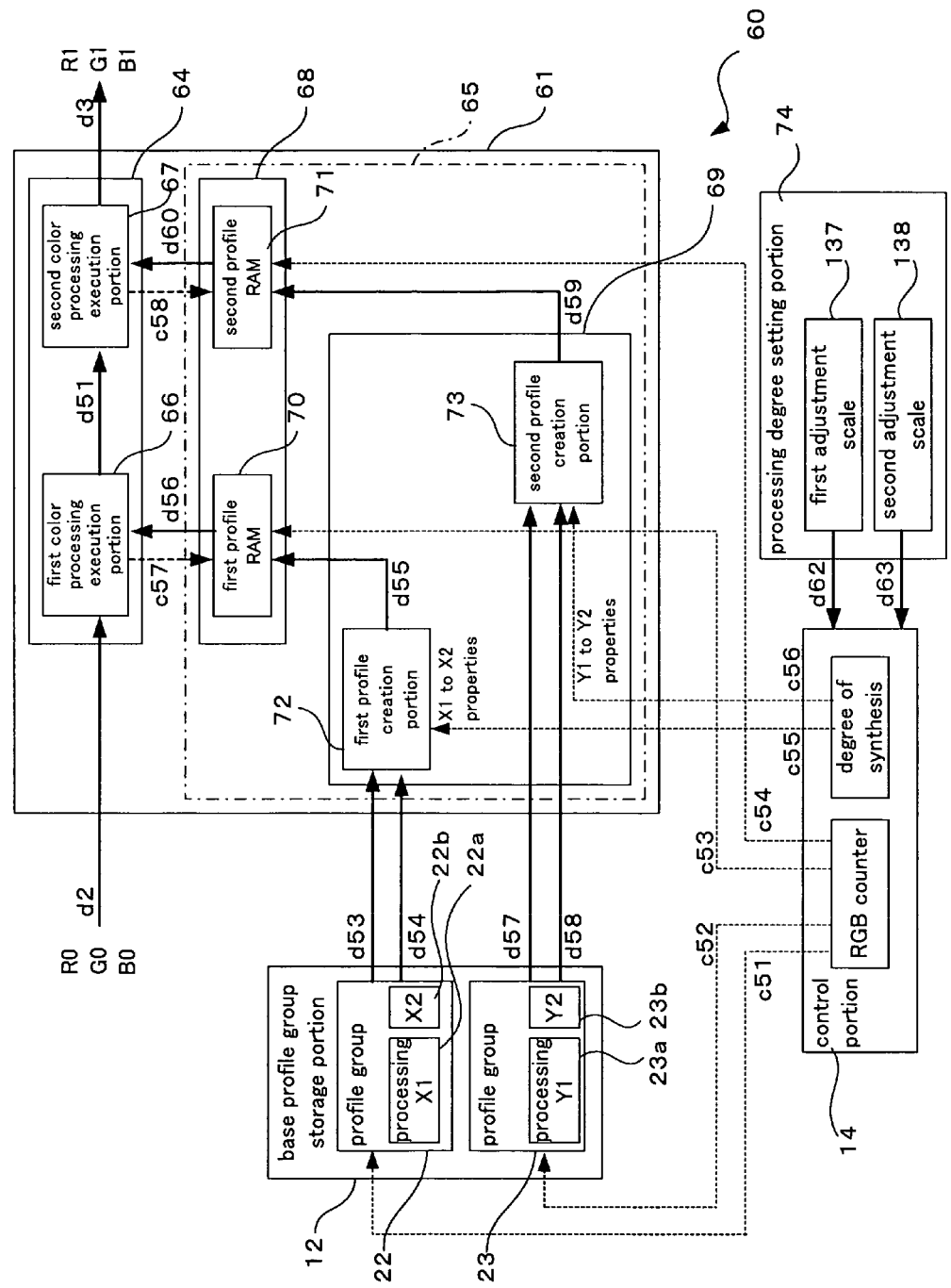
FIG. 10 is a block diagram for describing the specific configuration of the image processing device 60 (fourth embodiment).

FIG. 10 is a block diagram for describing the characteristic portions of the image processing device 60. The image processing device 60 is characterized in that the color processing portion 61 achieves color processing by executing a plurality of color processing operations in a superimposed manner, and in that the degree of processing for each of these color processing operations can be adjusted.

Additionally, the image processing device 60 is characterized in that it is provided with two lines of the color processing portion 13 shown in FIG. 2, and executes a plurality of color processing operations in series.

The following is a description of the color processing portion 61 and the base color transformation profiles of the base profile group storage portion 12, which are the characteristic aspects of the image processing device 60. It should be noted that a processing degree setting means 74 for adjusting the degree of processing of each of the color processing operations is substantially the same as the processing degree setting means 18 that was described in the first embodiment and its modified examples, and thus will not be described in detail. It should also be noted that portions that achieve the same functions as those already described in the first embodiment have been assigned the same reference numerals as in the first embodiment and will be not be described here.

<Configuration>

(Base Profile Group Storage Portion 12)

The base profile group storage portion 12 stores two profile groups 22 and 23, each of which is made of two base color transformation profiles. The profile group 22 is provided with two base color transformation profiles 22a and 22b for achieving a processing X1 and a processing X2, which achieve a processing X to different degrees of processing. The profile group 23 is provided with two base color transformation profiles 23a and 23b for achieving a processing Y1 and a processing Y2, which achieve a processing Y to different degrees of processing.

Here, the processing X and the processing Y are any one color processing of display color transformation, color gamut transformation, and memory color correction, or are a color processing that combines display color transformation, color gamut transformation, and memory color correction. The profile groups and the base color transformation profiles are the same as those described in the first embodiment.

(Color Processing Portion 61)

The color processing portion 61 is provided with two lines of the color processing portion 13 described using FIG. 2. More specifically, the color processing portion 61 has a color processing execution portion 64 and a profile creation portion 65. The color processing execution portion 64 has a first color processing execution portion 66 and a second color processing execution portion 67. The profile creation portion 65 has a profile RAM 68 and a profile creation execution portion 69. The profile RAM 68 has a first profile RAM 70 and a second profile RAM 71. The profile creation execution portion 69 has a first profile creation portion 72 and a second profile creation-portion 73.

The first profile creation portion 72 receives first selected profile data d53 and second selected profile data d54 as input and outputs first created profile data d55. The first selected profile data d53 are the data of the base color transformation profile 22a, which achieves a processing X1. The second selected profile data d54 are the data of the base color transformation profile 22b, which achieves a processing X2.

The first profile RAM 70 receives the first created profile data d55 as input and outputs first profile data for processing d56.

The first color processing execution portion 66 receives the image signal d2 and the first profile data for processing d56 as input and outputs an image processed signal d51 that has been color processed.

The second profile creation portion 73 receives third selected profile data d57 and fourth selected profile data d58 as input and outputs second created profile data d59. The third selected profile data d57 are the data of the base color transformation profile 23a, which is for achieving a processing Y1. The fourth selected profile data d58 are the data of the base color transformation profile 23b, which is for achieving a processing Y2.

The second profile RAM 71 receives the second created profile data d59 as input and outputs second profile data for processing d60.

The second color processing execution portion 67 receives the image processed signal d51 and the second profile data for processing d60 as input and outputs an output signal d3 that has been color processed.

(Processing Degree Setting Portion 74)

The processing degree setting portion 74 allows the user to set a target degree of color processing through a single axis adjustment scale. The adjustment scale is a sliding bar, displayed on a display screen, for example, of the image processing device 60, through which the degree of color processing is set.

The adjustment scale is the same as that described in the first embodiment using FIG. 3, except that here a first adjustment scale 137 for setting the degree of synthesis for the first profile creation portion 72 and a second adjustment scale 138 for setting the degree of synthesis for the second profile creation portion 73 are provided. The first adjustment scale 137 and the second adjustment scale 138 output a first target processing degree d62 and a second target processing degree d63 to the control portion 14 through the same operation as that of the adjustment scale described in the first embodiment or in [First Embodiment] <Modified Examples> (5).

The control portion 14 outputs a control signal c55 and a control signal c56 for specifying a degree of profile synthesis to the first profile creation portion 72 and the second profile creation portion 73 based on the first target processing degree d62 and the second target processing degree d63 that have been obtained.

Here, the relationship between the target processing degree values and the control signal values is the same as the relationship described in the first embodiment or in [First Embodiment] <Modified Examples> (5).

It should be noted that the range of the target processing degree values and the range of the control signal values are determined in accordance with the nature of the processing of the profile groups of the base profile group 12.

<Action>

(Base Profile Group Storage Portion 12)

The base profile group storage portion 12 receives count signals c51 and c52 from the control portion 14. The count signals c51 and c52 specify addresses in the base profile group storage portion 12 at a fixed count period, allowing the image signal values stored at the specified addresses to be read out. Specifically, due to the count signal c51, the data associated with the same image signal values (R0, G0, B0) in the base color transformation profiles 22a and 22b are read out simultaneously. Also, due to the count signal c52, the data associated with the same image signal values (R0, G0, B0) in the base color transformation profiles 23a and 23b are read out simultaneously.

(Color Processing Portion 61)

<<First Profile Creation Portion 72>>

The first profile creation portion 72 uses the degree of synthesis specified by the control signal c55 to create the first created profile data d55 from the first selected profile data d53 and the second selected profile data d54. The details of this are identical to those described in the first embodiment regarding the profile creation portion 30.

As a result, a color transformation profile that achieves a processing Xi is created. Here, [i] is the value of the degree of synthesis specified by the control signal c55.

<<First Profile RAM 70>>

The first profile RAM 70 obtains the first created profile data d55 and stores them at the address specified by the count signal c53 of the control portion 14. Here, the first created profile data d55 are associated with the same image signal values (R0, G0, B0) as the first selected profile data d53 and the second selected profile data d54 used to create the first created profile data d55.

In this way, a new color transformation profile for achieving any degree of synthesis with regard to the processing X is stored.

<<First Color Processing Execution Portion 66>>

The first color transformation execution portion 66 obtains the first profile data for processing d56, which are the data of the color transformation profile stored in the first profile RAM 70, by specifying the corresponding address with the count signal c57 based on the image signal values (R0, G0, B0) of the image signal d2, and with these executes color processing of the image signal d2. Specifically, it reads out the first profile data for processing d56 corresponding to the values of the upper 5 bits of the image signal values (R0, G0, B0) of the image signal d2, each of which is expressed by 8 bits. Further, the values of the lower 3 bits of the image signal values (R0, G0, B0) are used to perform three-dimensional interpolation of the first profile data for processing d56 that have been read out in order to obtain an image processed signal d51.

<<Second Profile Creation Portion 73, Second Profile RAM 71, Second Color Processing Execution Portion 67>>

In the same manner as described with regard to the first profile creation portion 72, the first profile RAM 70, and the first color processing execution portion 66, a color transformation profile that achieves a processing Yj (where [j] is the value of the degree of synthesis specified by the control signal c56) is created. Further, the second color processing execution portion 67 obtains the second profile data for processing d60, which are the data of the color transformation profile stored in the second profile RAM 71, by specifying the corresponding address with the count signal c58 according to the image signal values (R0', G0', B0') of the image processed signal d51, and with these executes color processing of the image processed signal d51.

<Effects>

The fourth embodiment obtains the following effects in addition to the effects described in the first embodiment and the second embodiment.

(1)

In the image processing device 60, if the profile group 22 or 23 is provided with additional base color transformation profiles, the amount that the storage capacity of the base profile group storage portion 12 must be increased is identical to the amount of data of the additional base color transformation profile(s). That is, in a case where the profile groups 22 and 23 each include three base color transformation profiles that achieve different degrees of processing, then it is sufficient for the image processing device 60 to have enough storage capacity for six base color transformation profiles.

On the other hand, in the case of the image processing device 26 described in [Second Embodiment] <Modified Examples> (1), a storage capacity of 3*3=9 base color transformation profiles is necessary.

In this regard, the image processing device 60 can be said to achieve the effect of reducing storage capacity.

Modified Examples (1)

The image processing device 60 was described as having a structure in which two lines of the color processing portion 13 described using FIG. 2 are arranged in series. This does not necessarily mean that twice the hardware is required, however. That is, the profile creation execution portion 69, the profile RAM 68, and the color processing execution portion 64 can be made of a single hardware unit. In this case, the data in each of these portions are processed in a sequential fashion.

Thus, although there is a drop in the real-time properties of the color processing, hardware costs are reduced.

(2)

This embodiment describes a case where the base profile group storage portion 12 is provided with two profile groups 22 and 23. Here, the invention can be expanded to include implementations having a greater number of profile groups. For example, it can be appreciated that if there are three profile groups, then the invention will have a structure in which three lines of the color processing portion 13 described using FIG. 2 are arranged in series.

In this case, the processing degree setting portion 74 will have additional adjustment scales.

By doing this, color processing that combines a greater variety of color processing operations can be achieved.

Fifth Embodiment

An image processing device 75, which employs a lookup table, according to a fifth embodiment is described. The image processing device 75 is a device that performs visual processing of an image signal as well as color processing of an image signal. The image processing device 75 is provided in a device that handles images, such as a computer, a digital camera, a portable telephone, a PDA, a printer, a scanner, or a digital television.

Figure 11:
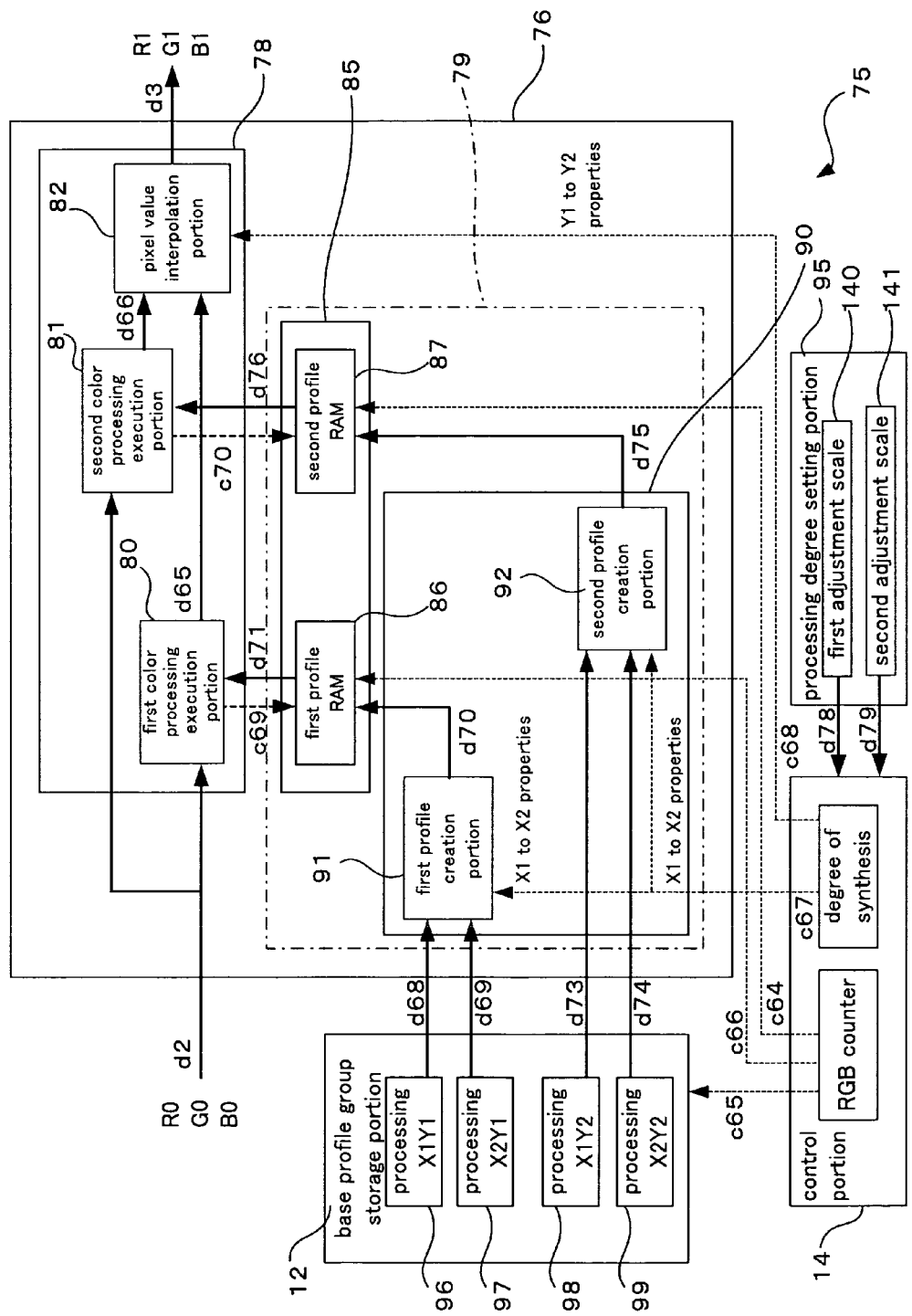
FIG. 11 is a block diagram for describing the specific configuration of the image processing device 75 (fifth embodiment).

FIG. 11 is a block diagram for describing the characteristic features of the image processing device 75. The image processing device 75 is characterized in that the color processing portion 76 achieves color processing by executing a plurality of color processing operations in a superimposed manner, and in that it is possible to adjust the degree to which each of these color processing operations is performed.

In addition, the image processing device 75 has the characteristic that, in contrast to the color processing execution portion 64 shown in FIG. 10, a color processing execution portion 78 performs color processing in parallel and interpolates the image signal values obtained as the result of this processing.

The following is a description of the color processing portion 76 and the base color transformation profiles provided in the base profile group storage portion 12, which are characteristic features of the image processing device 75. It should be noted that a processing degree setting means 95 for adjusting the degree of processing of each of the color processing operations is substantially the same as the processing degree setting means 18 that was described in the first embodiment and its modified examples, and thus will not be described in detail. It should also be noted that portions that achieve the same functions as those already described in the first embodiment have been assigned the same reference numerals as in the first embodiment and will be not be described.

<Configuration>

(Base Profile Group Storage Portion 12)

The base profile group storage portion 12 shown in FIG. 11 stores the base color transformation profiles 96 to 99. The details are identical to those of the base profile group storage portion 12 that stores four types of base color transformation profiles that was described in [Second Embodiment] <Modified Examples> (1), and thus will not be described here.

(Color Processing Portion 76)

The color processing portion 76 differs from the color processing portion 61 that was described using FIG. 10 in the structure of its color processing execution portion 78. The profile RAM 85 and the profile creation execution portion 90 have the same structures as the profile RAM 68 and the profile creation execution portion 69 that were described using FIG. 10, and thus will not be described in detail.

The profile RAM 85 and the profile creation execution portion 90 differ from the profile RAM 68 and the profile creation execution portion 69 that were described using FIG. 10 in the data that they handle.

Specifically, this difference is described below. Firstly, the first through fourth selected profile data d68, d69, d73, and d74 are the data of the base color transformation profiles 96 to 99, respectively.

Secondly, the first profile creation portion 91 and the second profile creation portion 92 create the first created profile data d70 for achieving the processing Xi and the processing Y1 and the second created profile data d75 for achieving the processing Xi and the processing Y2. That is, the control signal c67 specifies the same degree of synthesis to the first profile creation portion 91 and the second profile creation portion 92.

Thirdly, the first profile RAM 86 and the second profile RAM 87 store the first created profile data d70 and the second created profile data d75 and output first profile data for processing d71 and second profile data for processing d76, respectively.

<<Color Processing Execution Portion 78>>

The color processing execution portion 78 is provided with a first color processing execution portion 80, a second color processing execution portion 81, and a pixel value interpolation portion 82.

The first color processing execution portion 80 receives the image signal d2 and the first profile data for processing d71 as input and outputs a first image processed signal d65 that has been color processed. The second color processing execution portion 81 receives the image signal d2 and the second profile data for processing d76 as input and outputs a second image processed signal d66 that has been color processed. The pixel value interpolation portion 82 receives the first image processed signal d65 and the second image processed signal d66 as input and outputs an output signal d3.

(Processing Degree Setting Portion 95)

The processing degree setting portion 95 allows the user to set a target degree of color processing through a single axis adjustment scale. The adjustment scale is a sliding bar, displayed on a display screen, for example, of the image processing device 75, through which the degree of color processing is set.

The adjustment scale is the same as that described in the first embodiment using FIG. 3, except that here a first adjustment scale 140 for setting the degree of synthesis for the first profile creation portion 91 and the second profile creation portion 92, and a second adjustment scale 141 for setting the degree of synthesis for the first image processed signal d65 and the second image processed signal d66, are provided. The first adjustment scale 140 and the second adjustment scale 141 output a first target processing degree d78 and a second target processing degree d79 to the control portion 14 through the same operation as that of the adjustment scale described in the first embodiment or in [First Embodiment] <Modified Examples> (5).

The control portion 14 outputs a control signal c67 for specifying a degree of profile synthesis for the first profile creation portion 91 and the second profile creation portion 92 and a control signal c68 for specifying a degree of synthesis of the first image processed signal d65 and the second image processed signal d66, based on the first target processing degree d78 and the second target processing degree d79 that have been obtained.

Here, the relationship between the target processing degree values and the control signal values is the same as the relationship described in the first embodiment or in [First Embodiment] <Modified Examples> (5).

It should be noted that the range of the target processing degree values and the range of the control signal values are determined in accordance with the nature of the processing of the profile groups of the base profile group 12.

<Action>

The operation of the color processing execution portion 78, which is a characteristic portion of the image processing device 75, is described below.

(Color Processing Execution Portion 78)

The first color processing execution portion 80 obtains the first profile data for processing d71, which are the data of the color transformation profile stored in the first profile RAM 86, by specifying the corresponding addresses with the count signal c69 according to the image signal values (R0, G0, B0) of the image signal d2, and with these executes color processing of the image signal d2. The first color processing execution portion 80 performs the same operation as the color processing execution portion 16 shown in FIG. 2, and thus will not be described in detail.

As a result, the first image processed signal d65 obtained by subjecting the image signal d2 to the processing Xi and the processing Y1 is output.

The second color processing execution portion 81 obtains the second profile data for processing d76, which are the data of the color transformation profile stored in the second profile RAM 87, by specifying the corresponding address with the count signal c70 based on the image signal values (R0, G0, B0) of the image signal d2, and with these executes color processing of the image signal d2. The second color processing execution portion 81 performs the same operation as the color processing execution portion 16 shown in FIG. 2, and thus will not be described in detail.

Thus, a second image processed signal d66 that has been obtained by performing the processing Xi and the processing Y2 on the image signal d2 is output.

The pixel value interpolation portion 82 interpolates the first image processed signal d65 and the second image processed signal d66 with the degree of synthesis that is specified by the control signal c68.

Thus, an output signal d3 that is obtained by performing the processing Xi and the processing Yj on the image signal d2 is output. Here, [j] is the value of the degree of synthesis specified by the control signal c68.

<Effect>

The fifth embodiment obtains the following effects in addition to the effects described in the first embodiment and the second embodiment.

(1)

The pixel value interpolation portion 82 interpolates the pixel values of the first image processed signal d65 and the pixel values of the second image processed signal d66 with the degree of synthesis that is specified by the control signal c68. Thus, the output signal d3 can be calculated easier than if color processing is performed on the image signal through three-dimensional interpolation. That is, using the control signal c68 it is possible to change the degree of the processing Y in real time.

(2)

The effects of the invention are not limited to a case in which the base profile group storage portion 12 is provided with this number of base color transformation profiles. That is, it is also possible to provide a greater number of base color transformation profiles than in the base profile group storage portion 12 shown in FIG. 11, which allows the invention to be expanded to attain color processing that superimposingly combines a greater number of color processing operations.

In this case, the processing degree setting portion 95 will have additional adjustment scales.

Sixth Embodiment

An image processing device 150 that employs matrix computation according to a sixth embodiment is described. The image processing device 150 is a device that performs visual processing of an image signal as well as color processing of an image signal. The image processing device 150 is provided in a device that handles images, such as a computer, a digital camera, a portable telephone, a PDA, a printer, a scanner, or a digital television.

Figure 12:
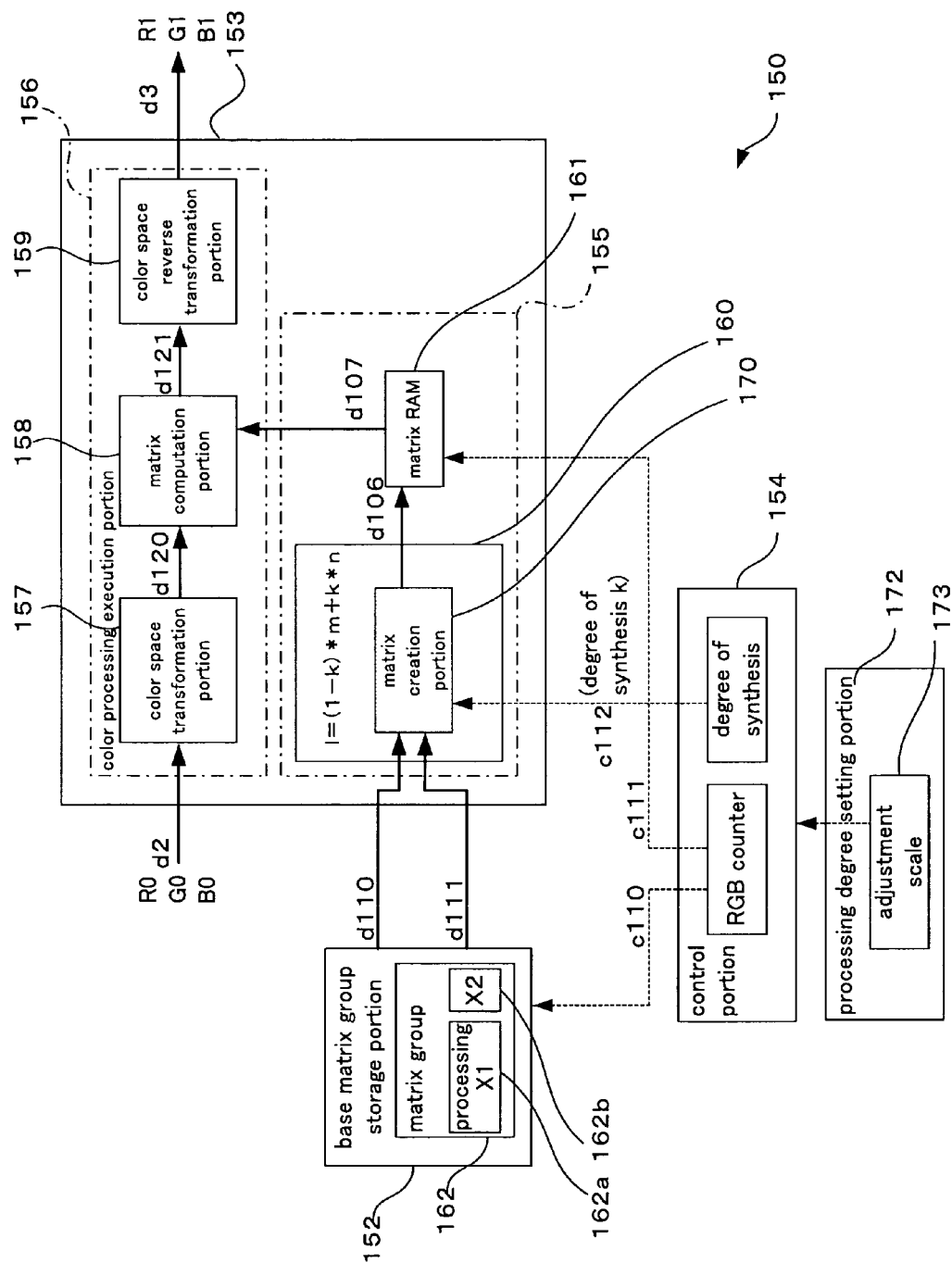
FIG. 12 is a block diagram for describing the specific configuration of the image processing device 150 (sixth embodiment).

FIG. 12 is a block diagram for describing the characteristic features of the image processing device 150. The image processing device 150 is characterized in that a color processing execution portion 156 performs color processing through matrix computation, and in that it is possible to adjust the degree of color processing.

The following is a description of the color processing portion 153, a processing degree setting portion 172 that allows the degree of color processing in the color processing portion 153 to be set through a control portion 154, and the base color transformation matrices provided in a base matrix group storage portion 152, which are characteristic aspects of the image processing device 150. It should be noted that portions that achieve the same function as portions already described in the first embodiment have been assigned the same reference numerals as in the first embodiment and are not be described here.

<Configuration>

The image processing device 150 shown in FIG. 12 is provided with a base matrix group storage portion 152 that stores base color transformation matrices, which serve as a basis for color processing, and outputs selected matrix data d110 and d111, which are the data of the selected base color transformation matrix, a color processing portion 153 that receives the image signal d2 and the selected matrix data d110 and d111 as input and outputs an color-processed output signal d3, a control portion 154 that gives control signals c110 to c112 to the various portions, and a processing degree setting portion 172 that allows the degree of color processing in the color processing portion 153 to be set.

<Base Matrix Group Storage Portion 152>

The base matrix group storage portion 152 stores a matrix group made of a plurality of base color transformation matrices. In the image processing device 150 shown in FIG. 12, the base matrix group storage portion 152 stores a matrix group 162 that is made of two base color transformation matrices. The matrix group 162 is provided with two base color transformation matrices 162a and 162b for achieving a processing X1 and a processing X2, which differ in their degree of a processing X. Hereinafter, the processing X is described as memory color correction of skin tone.

The base color transformation matrices stored in the base matrix group storage portion 152 are calculated in advance by a personal computer (PC) external to the image processing device. The base matrix group storage portion 152 is constituted by a ROM, a storage medium (e.g. RAM or hard disk) with which overwriting and data updating are possible, or a storage medium (memory card, etc.) that can be removed from the image processing device 150, and has read the base color transformation matrices that have been calculated in advance. If data in the base matrix group storage portion 152 can be overwritten/updated, then by connecting the base matrix group storage portion 152 to an outside network, the base color transformation matrices can be freely updated from the outside.

<<Matrix Group>>

The matrix group is described. The matrix group is a group made of base color transformation matrices that have different degrees of processing for the same color processing. The matrix group has the function of achieving any one color processing of display color transformation, color gamut transformation, and memory color correction, or alternatively has the function of achieving color processing that combines display color transformation, color gamut transformation, and memory color correction. For example, in the case of the matrix group 162, the base color transformation matrices 162a and 162b achieve memory color correction of skin tone at differing degrees of correction.

More specifically, each base color transformation matrix achieves the same function "memory color correction of skin tone" but at different degrees of processing, as in the base color transformation matrix 162a achieves memory color correction toward a white skin tone and the base color transformation matrix 162b achieves memory color correction toward a yellow skin tone.

<<Base Color Transformation Matrix>>

The base color transformation matrices are described below. The base color transformation matrices are computation matrices that give signal values after color processing (L1, a1, b1) for signal values (L0, a0, b0) that are obtained by transforming image signal values in a RGB color space (R0, G0, B0), each of which is expressed by 8 bits, into a Lab color space. The base color transformation matrices are three-row by three-column coefficient matrices whose size corresponds to the 3D signal values (L0, a0, b0) before color processing.

(Color Processing Portion 153)

The color processing portion 153 has a matrix creation portion 155 that receives the selected matrix data d110 and d111 as input and outputs matrix data for processing d107, and a color processing execution portion 156 that receives the image signal d2 and the matrix data for processing d107 as input and outputs an output signal d3.

The matrix creation portion 155 is made of a matrix creation execution portion 160 that receives the selected matrix data d110 and d111 as input and outputs created matrix data d106 that are created based on the selected matrix data d110 and d111, and a matrix RAM 161 that stores the created matrix data d106 as input and outputs matrix data for processing d107, which are the data, of the stored data, that will be used for color processing. The matrix creation execution portion 160 further includes a matrix creation portion 170. The matrix creation portion 170 receives the selected matrix data d110 and d111 as input and outputs the created matrix data d106.

The color processing execution portion 156 is provided with a color space transformation portion 157 that receives an RGB color space image signal d2 (image signal values (R0, G0, B0)) as input, transforms the color space of the image signal d2, and outputs the result of this transformation as a transformed image signal d120 in Lab color space (image signal values (L0, a0, b0)), a matrix computation portion 158 that receives the transformed image signal d120 as input, performs matrix computation based on the matrix data for processing d107, and outputs a processed image signal d121 in Lab color space (image signal values (L1, a1, b1), and a color space reverse transformation portion 159 that receives the processed image signal d121 as input, performs color space transformation of the processed image signal d121, and outputs the result of this transformation as an output signal d3 in RGB color space (image signal values (R1, G1, B1)).

(Processing Degree Setting Portion 172)

The processing degree setting portion 172 allows the user to set a target degree of color processing. That degree of color processing that has been set is output as a target processing degree d108.

The processing degree setting portion 172 allows the user to set a target degree of color processing through a single axis adjustment scale 173. The adjustment scale 173 is a sliding bar that is displayed on a display screen, for example, of the image processing device 150 and is similar to the adjustment scale that was described in the first embodiment using FIG. 3.

<Action>

The action of these portions is described below.

(Base Matrix Group Storage Portion 152)

A count signal c110 from the control portion 154 is input to the base matrix group storage portion 152. The count signal c110 specifies addresses in the base matrix group storage portion 152 at a fixed count period, allowing the elements of the base color transformation matrices 162a and 162b that are stored in the specified addresses to be read out.

Addresses are specified by simultaneously reading out corresponding elements in the two base color transformation matrices 162a and 162b. The data that are read out in this manner are output from the base matrix group storage portion 152 as first selected matrix data d110 and second selected matrix data d111. Specifically, the elements of the base color transformation matrix 162a are output as the first selected matrix data d110 and the elements of the base color transformation matrix 162b are output as the second selected matrix data d111.

(Processing Degree Setting Portion 172)

The processing degree setting portion 172 outputs a target processing degree d108 in response to operation of the adjustment scale 173 by the user. The value of the target processing degree d108 is [0] if the sliding bar is located at the left end and [1] if the sliding bar is located at the right end, and when the sliding bar is at other positions, a value corresponding to the position of the sliding bar that is greater than 0 but less than 1 is output.

(Color Processing Portion 153)

<<Matrix Creation Portion 170>>

The matrix creation portion 170 obtains the first selected matrix data d110 and the second selected matrix data d111 from the base matrix group storage portion 152. It is also supplied with a control signal c112, from the control portion 154, that specifies the degree of synthesis of the base color transformation matrices 162a and 162b.

The value of the degree of synthesis that is given by the control signal c112 is the value of the target processing degree d108.

The matrix creation portion 30 uses the value [k] of the degree of synthesis specified by the control signal c112 to create created matrix data d106 having a value [l] from the value [m] of the first selected matrix data d110 and the value [n] of the second selected matrix data d111. Here, the value [l] is calculated by [l]=(1−k)*[m]+k*[n]. That is, if the value [k] is 0≦k≦1, then the first selected matrix data d110 and the second selected matrix data dill are interpolated.

<<Matrix RAM 161>>

The matrix RAM 161 obtains the created matrix data d106 that are created by the matrix creation portion 170 and stores them at the addresses specified by the count signal c111 of the control portion 154. Here, the created matrix data d106 are associated with the first selected matrix data d110 and the second selected matrix data d111 used to create the created matrix data d106 as elements of the same position.

Thus, a new color transformation matrix that achieves a processing Xk having a desired degree of processing is created based on the base color transformation matrices 162a and 162b for achieving the processing X1 and X2.

<<Color Processing Execution Portion 156>>

The color space transformation portion 157 receives an RGB color space image signal d2 (image signal values (R0, G0, B0)) as input, transforms the color space of the image signal d2, and outputs the result of this transformation as a transformed image signal d120 in Lab color space (image signal values (L0, a0, b0)).

The matrix computation portion 158 performs matrix computation of the transformed image signal d120 using the new color transformation matrix stored in the matrix RAM 161. Specifically, it performs a computation to integrate the image signal values (L0, a0, b0) of 3 rows 1 column from the right of the 3-row 3-column new color transformation matrix that is obtained by interpolating the 3-row 3-column base color transformation matrices 162a and 162b. This yields a 3-row 1-column processed image signal d121 (image signal values (L1, a1, b1)).

The color space reverse transformation portion 159 receives the processed image signal d121 as input, transforms the color space of the processed image signal d121, and outputs the result of this transformation as an output signal d3 in RGB color space (image signal values (R1, G1, B1)).

<Effect>

(1)

With memory color correction, color processing is performed for at least two of the three properties (brightness, vividness, hue) of the image signal d2. The image processing device 150 of the present invention thus allows the degree of memory color correction of skin tone to be adjusted simply by supplying a single target processing degree d108. That is, memory color correction can be adjusted with greater ease than in a case where each property is adjusted independently to perform memory color correction for each property.

It should be noted that in the foregoing embodiment the base color transformation matrices 162a and 162b were described as achieving memory color correction of skin tone. The effects of the invention are not limited to a case in which the color processing that is achieved by the base color transformation matrices 162a and 162b is memory color correction of skin tone. For example, the invention can also find application in a case where the base color transformation matrices 162a and 162b achieve memory color correction of green foliage or blue sky, as well as cases in which the color processing is display color transformation or color gamut transformation or is a combination of display color transformation, color gamut transformation, and memory color correction.

(2)

In the memory color correction of the invention, matrix data for processing d107, which is a color transformation matrix created by customizing a plurality of base color transformation matrices, are used. That is, it is possible to achieve color processing in which the degree to which memory color correction is realized by a plurality of base color transformation matrices has been customized.

It is therefore possible to use suitable base color transformation matrices and also achieve memory color correction to any degree. That is, suitable memory color correction can be achieved by performing simple adjustments.

When customizing the base color transformation matrices, the base color transformation matrices are interpolated based on the target processing degree d108. It is thus possible to create a color transformation matrix that realizes suitable memory color correction based on the base color transformation matrices.

(3)

The image processing device 150 can achieve any degree of memory color correction simply by providing the base matrix group storage portion 152 with a small number of base color transformation matrices 162a and 162b. For this reason, it is not necessary to prepare color transformation matrices that have different degrees of processing other than this small number of base color transformation matrices, and this allows the storage capacity of the base matrix group storage portion 152 to be reduced.

(4)

The matrix creation execution portion 160 arrives at the values of the elements of a new color transformation matrix by interpolating or extrapolating corresponding elements in the base color transformation matrices based on the target processing degree d108 that has been set by the processing degree setting portion 172. Thus, new color transformation matrices that achieve any degree of processing can be created by freely changing the degree of synthesis of the base color transformation matrices.

(5)

If the base color transformation matrices achieve a combination of a plurality of color processing operations, then the time required for the image processing device 150 to perform the plurality of color processing operations can be shortened compared to a case where the plurality of color processing operations are executed one by one. Further, at least some of the color processing operations of the plurality of color processing operations can be executed at a desired degree of processing.

Modified Examples

The invention is not limited to the foregoing embodiment, and various modifications and improvements can be made thereto without departing from the scope of the invention. Further, the information described in the first through fifth embodiments can be suitably modified to apply to the image processing device 150. Examples of characteristic modifications to the sixth embodiment are described below.

(1)

The foregoing embodiment describes a case in which the matrix group 162 has two base color transformation matrices 162a and 162b. The number of base color transformation matrices is not limited to this, however. That is, the matrix group 162 can include a greater number of base color transformation matrices.

In such a case, the control portion 154 determines which base color transformation matrices to interpolate or extrapolate from the value of the target processing degree d108 that is output from the processing degree setting portion 172.

It is also possible for the base matrix group storage portion 152 to have a plurality of matrix groups.

In this case, the control portion 154 determines the matrix group for which the degree of processing has been provided, based on the value of the target processing degree d108.

(2)

The foregoing embodiment describes a case in which the matrix computation portion 158 performs matrix computation in a Lab color space. The effects of the invention are not limited to this case, however.

For example, the computation result can also be expressed in a RGB, CMYK, YUV, HSB, HSL, or CIELuv color space.

In this case, the base matrix group storage portion 152 will have base color transformation matrices in the color space in which the matrix computation is to be performed.

In the foregoing embodiment, the base color transformation matrices are 3-row by 3-column coefficient matrices whose size corresponds to the three-dimensional signal values before color processing (L0, a0, b0). The effects of the invention are not limited to this, however. That is, the number of rows and columns of the base color transformation matrices can be greater or smaller than this.

For example, the base color transformation matrices can be matrices that provide transformation coefficients for only some of the three-dimensional signal values before color processing (L0, a0, b0). More specifically, they can also be 2-row by 2-column coefficient matrices that provide transformation coefficients for only the color values (a0, b0). In this case, the image processing device 150 attains the effect of reducing the color processing burden and reducing the storage capacity for the base color transformation matrices.

It is also possible for the base color transformation matrices to provide transformation coefficients for nonlinear terms based on the three-dimensional signal values (L0, a0, b0). More specifically, they can also be matrices that give transformation coefficients for not only the three-dimensional signal values before color processing (L0, a0, b0) but also for the square or cross-term of the input, such as (a0\*a0, a0\*b0, etc.). In this case, the base color transformation matrices become even larger, such as three rows by ten columns. As a result, the image processing device 150 can increase the precision of color processing.

(3)

The foregoing embodiment describes the value of the target processing degree d108 as a value in the range of 0 to 1. Here, the effects of the invention are not limited to this value range.

For example, it is also possible for the value of the target processing degree d108 that is output to be less than [0] (such as −1.5) if the sliding bar is located at the left end and a value that is greater than [1] (such as +1.5) if the sliding bar is located at the right end, and when the sliding bar is at other positions, for the value corresponding to the position of the sliding bar to be greater than −1.5 but less than +1.5.

The control signal c112 gives the value of the target processing degree d108 as the value of the degree of synthesis, and the matrix creation portion 30 uses the value [k] of the degree of synthesis that is specified by the control signal c112 to create the created matrix data d106 having a value [l] from the value [m] of the first selected matrix data d110 and the value [n] of the second selected matrix data d111. Here, the value [l] is calculated by [l]=(1−k)*[m]+k*[n]. Thus, if the value [k] is outside of the range $0 \leq k \leq 1$, then the first selected matrix data d110 and the second selected matrix data d111 are extrapolated.

(4)

It is also possible for the image processing device 150 to be further provided with a decision portion that decides whether or not to perform matrix computation in accordance with the value of the transformed image signal d120.

In the foregoing embodiment, the matrix data for processing d107 are used to apply matrix computation to all values of the transformed image signal d120. The color transformation matrix for achieving memory color correction of skin tone is therefore used to perform color processing with the same correction trend as that for other colors, including green foliage and blue sky.

On the other hand, it is possible to provide a decision portion and to perform matrix computation only when values of the transformed image signal d120, such as (a0, b0), are within a predetermined region.

It thus becomes possible to apply the color transformation matrix for achieving memory color correction of skin tone only when the values of the transformed image signal d120 are near skin tone values.

Seventh Embodiment

An image processing system according to a seventh embodiment is described using FIGS. 13 to 21. The image processing system is provided in a device that handles images, such as a computer, a digital camera, a portable telephone, a PDA, a printer, a scanner, or a digital television.

<Configuration/Action>

Figure 13:
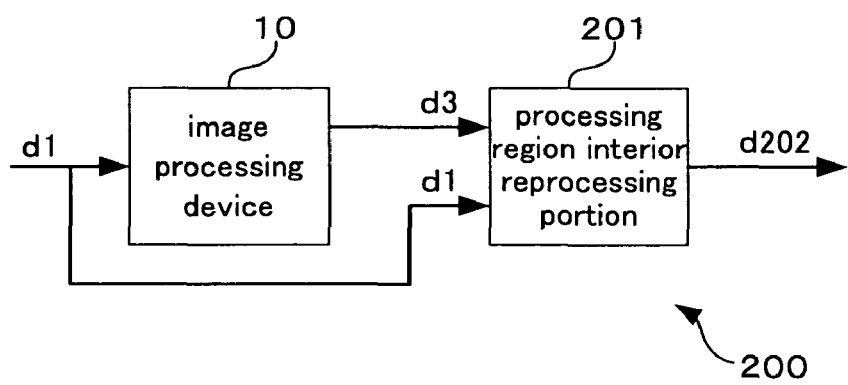
FIG. 13 is a block diagram for describing the basic configuration of the image processing system 200 (seventh embodiment).

The image processing system 200 shown in FIG. 13 is a system for performing a preview display. A preview display is a display for confirming the image processing to be performed by the image processing device 10 described in the above embodiment, and is performed by a display device such as a monitor that is provided in or attached to the above device. A preview display can also be a display that is displayed on a sub-screen of the monitor when operation of the adjustment scale of the image processing device 10 has been detected.

(Issues and Means for Solving the Issues)

In general, when displaying an image that has been image-processed by an image processing device, there is a possibility that the image that is displayed will appear unnatural.

For example, when displaying a signal that has been image processed by an image processing device, there are occasions where the colors of the image-processed signal are not faithfully reproduced. More specifically, the colors of an image-processed signal may not be faithfully reproduced if the color gamut of the image-processed signal is wider than the color gamut that can be displayed on the display screen of a computer, for example, or if the color gamut of the image-processed signal is wider than the color gamut that can be printed by a printer.

Further, if the degree of image processing by the image processing device is adjusted, then there is the possibility that the gradation order of the image-processed signal is different than the gradation order prior to image processing.

It is an object of the present invention to prevent the display of unnatural images. Specifically, an object of the invention is to perform a preview display in advance so as to allow users to easily confirm particular sections in an image-processed signal that may be displayed unnaturally.

An image processing system 200 that achieves this goal is made of the image processing device 10 for image processing an input signal d1, and a processing region interior reprocessing portion 201 that outputs a preview display signal d202 based on the input signal d1 and an output signal d3, which is the output of the image processing device 10. In particular, the invention is characterized in the processing of the processing region interior reprocessing portion 201.

It should be noted that in this embodiment the image processing system 200 is described as being provided with the image processing device 10 that was described above. The invention is not limited to this, however, and it is also possible for the image processing system 200 to be provided with a separate image processing device that has been described in the above embodiments (for example, the image processing device 26, 45, 60, or 75), the image processing device 150 described as prior art, or an other image processing device that is known in the conventional art. In this image processing device, the input signal d1 is image processed using a predetermined function or an LUT. Image processing here includes processing for detecting the color within a predetermined color gamut and increasing its brightness. In this image processing, the user can adjust the degree of image processing by inputting the gain, for example, of the brightness, or the degree of image processing can be adjusted by a default adjustment amount.

In this embodiment, the input signal d1 is input to the system. However, the invention is not limited to this, and the signal that is input can also be a preview signal for performing a preview display. A preview signal is an image signal that is obtained by shrinking the input signal d1 to a size for preview. Naturally, when a preview signal is received, the image processing device used in the invention will perform processing that corresponds to the size of the preview signal.

In the image processing system 200 shown in FIG. 13, the image processing device 10 and the region processing interior reprocessing portion 201 are shown as separate units, but it is also possible to share portions that can be shared by the configurations of the image processing device 10 and the region processing interior reprocessing portion 201. For example, memories that are required for processing in both of these components can be shared.

The following is a more detailed description of the processing region interior reprocessing portion 201, which is a characteristic aspect of the invention.

(Processing Region Interior Reprocessing Portion 201)

Figure 14:
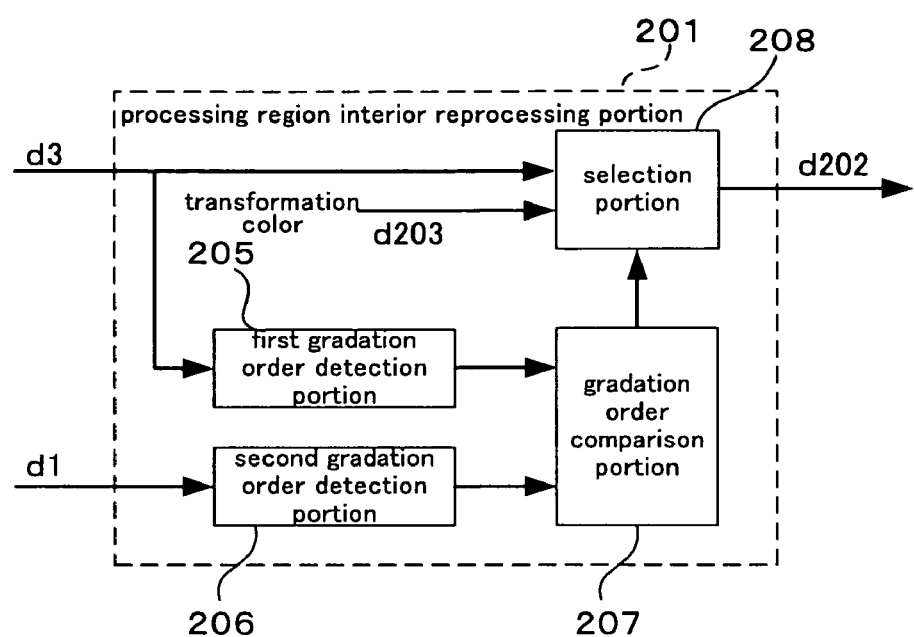
FIG. 14 is a block diagram for describing the structure of the processing region interior reprocessing portion 201 (seventh embodiment).

FIG. 14 is a block diagram that describes the structure of the processing region interior reprocessing portion 201. The processing region interior reprocessing portion 201 determines whether or not the gradation order of the input signal d1 is retained in the output signal d3 after image processing, and displays those portions that are not retained in a manner that allows them to be readily confirmed by a user.

The processing region interior reprocessing portion 201 is made of a first gradation order detection portion 205, a second gradation order detection portion 206, a gradation order comparison portion 207, and a selection portion 208.

The first gradation order detection portion 205 detects the gradation order of each pixel of the output signal d3. The second gradation order detection portion 206 detects the gradation order of each pixel of the input signal d1. The gradation order comparison portion 207 compares, for each pixel, the gradation orders that have been detected by the first gradation order detection portion 205 and the second gradation order detection portion 206. The selection portion 208 outputs a preview display signal d202 that displays portions of the output signal d3 in which the gradation order has changed, based on the results of the comparison by the gradation order comparison portion 207.

Here, the "gradation order" and the "method for detecting" the gradation order are described.

The gradation order is the order in which the level (gradation) of the luminance values of the input color signal (RGB signal or signal having another color space) or the input signal are compared for each pixel. Specifically, the gradation order is detected by comparing the size of the pixel values of a target pixel whose gradation order is to be determined and adjacent pixels that are adjacent to the target pixel.

Figure 15:
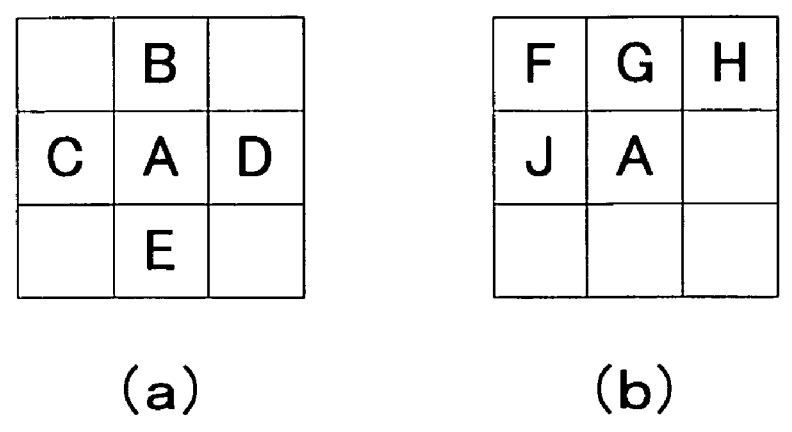

The method for detecting the gradation order is described below using FIG. 15.

FIG. 15(a) shows adjacent pixels B through E chosen for a target pixel A.

In the case of FIG. 15(a), pixel A is the target pixel, and the relationship in size among of the four combinations having the positional relationships of A and B (up), A and C (left), A and D (right), and A and E (down) before and after image processing are determined. The relationship in size among those combinations before image processing is determined by the second gradation order detection portion 206 comparing those pixel values of the input signal d1, which is stored on a memory or the like that is not shown. The relationship in size among those combinations after image processing is determined by the first gradation order detection portion 205 comparing those pixel values of the output signal d3, which is stored on a memory or the like that is not shown. The relationships in size among those combinations are determined for each component (such as for each RGB component) of the input signal d1 and the output signal d3.

It should be noted that method for arriving at the adjacent pixels is not limited to the four directions mentioned above. For example, the adjacent pixels can be the eight surrounding pixels or can be the four diagonal pixels. Further, if there are no pixels either above, below, left, or right of the target pixel A, then those portions lacking pixels can be ignored.

The gradation order comparison portion 207 (see FIG. 14) obtains the results of the determinations by the first gradation order detection portion 205 and the second gradation order detection portion 206, and compares the relationship in size before and after image processing for each color component of all four combinations. For example, if there is no difference in the relationship in size before and after image processing for each color component of all four combinations, then the gradation order comparison portion 207 outputs a signal that indicates that there is no change in the gradation order of the target pixel A to the selection portion 208. On the other hand, if there is a change in the size relationship before and after image processing for even one color component of any one of the four combinations, then the gradation order comparison portion 207 outputs a signal that indicates that there is a change in the gradation order of the target pixel A to the selection portion 208.

Here, the gradation order comparison portion 207 outputs the value [0], for example, as the signal that indicates that there is no change in the gradation order of the target pixel A.

On the other hand, the gradation order comparison portion 207 outputs the value [1], for example, as the signal that indicates that there has been a change in the gradation order of the target pixel A. It should be noted that the form that the signal that is output by the gradation order comparison portion 207 takes is not limited to this, and it is only necessary that the signal allows the selection portion 208 to identify whether or not the gradation order of the target pixel A has changed.

The method through which the gradation order comparison portion 207 determines whether or not a change has (not) occurred in the gradation order is not limited to the above method. For example, it is also possible for the gradation order comparison portion 207 to determine that a change has (not) occurred in the gradation order if there has (not) been a change in the relationship in size before and after image processing of a predetermined number of the four combinations. It is also possible for the gradation order comparison portion 207 to determine that a change has (not) occurred in the gradation order at that pixel combination if there has (not) been a change in the relationship in size among a predetermined number of color components before and after image processing.

The selection portion 208 receives the output signal d3 and a transformation color signal d203, which indicates a predetermined transformation color and is a predetermined pixel value stored in a memory or the like (not shown) as input, and selects either one of the output signal d3 and the transformation color signal d203 and outputs the result of this selection as a preview display signal d202. Here, the procedure by which the selection portion 208 makes this selection is described below. That is, if 0 is the value of the signal that is obtained from the gradation order comparison portion 207 (if there is no change in the gradation order), then the output signal d3 is selected. On the other hand, if 1 is the value of the signal that is obtained from the gradation order comparison portion 207 (if there has been a change in the gradation order), then the transformation color signal d203 is selected. That is, the selection portion 208 outputs the value of the target pixel A after image processing (the output signal d3) as the preview display signal d202 if no change has occurred in the gradation order of the target pixel A, and outputs the transformation color signal d203, which indicates a predetermined transformation color, as the preview display signal d202 in place of the value of the target pixel A after image processing if there has been a change in the gradation order of the target pixel A.

It should be noted that the predetermined transformation color can be any color as long as it allows the user to recognize that there has been a change in the gradation order of the target pixel, and for example can be a color such as red, blue, or green. It is also possible to provide a portion for automatically setting the transformation color and for this portion to give a color that is a negative of the color of the target pixel A.

It should be noted that the above describes the case of determining whether or not there has been a change in gradation order for all of the color components of an RGB signal, but there is no limitation to this color space. It is further possible to create a luminance signal and determine whether or not there has been a change in the gradation order for only that luminance signal.

The method for arriving at the adjacent pixels that are adjacent to the target pixel A is not limited to that shown in FIG. 15(a). For example, as shown in FIG. 15(b), it is also possible for the pixels upper left, above, upper right, and right of the target pixel A to be regarded as adjacent pixels (adjacent pixels F through J). In this case, it is possible to regard the pixels that are input before the target pixel A as adjacent pixels, and with these detect the gradation order with the first gradation order detection portion 205 and the second gradation order detection portion 206. Thus, the pixels of the output signal d3 and the input signal d1 that are sequentially input can be sequentially processed. That is, it is possible to reduce the capacity of the memories for storing the pixel values of the output signal d3 and the input signal d1 and also to achieve faster processing.

<Effects>

Figure 16:
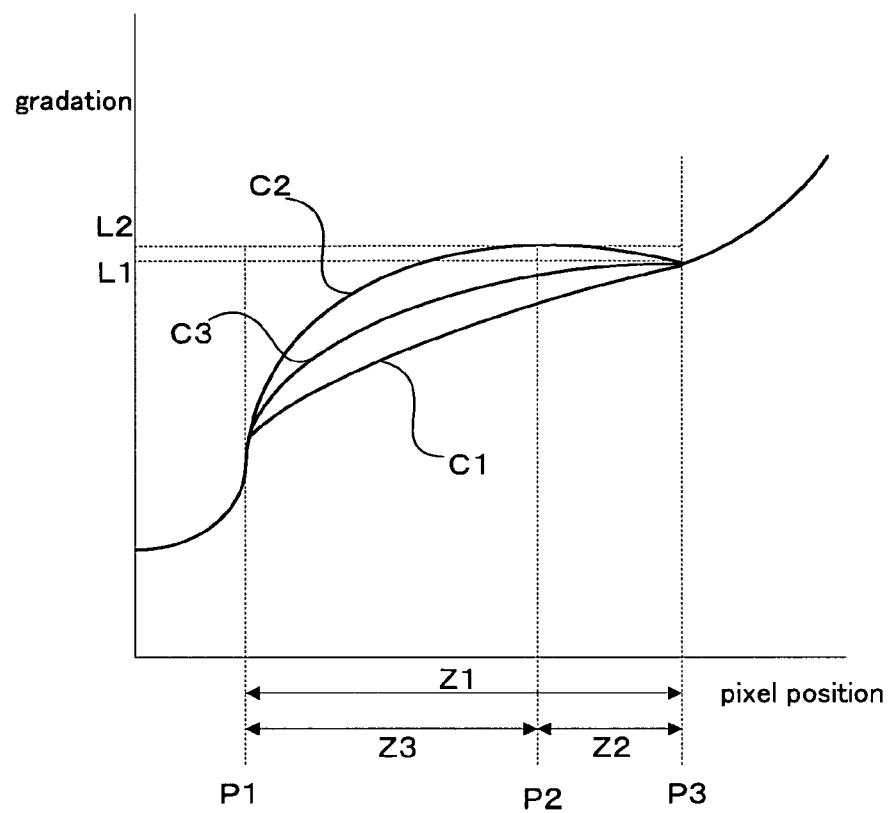
FIG. 16 is an explanatory diagram for describing the effects of the image processing system 200 (seventh embodiment).

The effects of the image processing system 200 are described using FIG. 16.

The curve C1 plots an example of the gradation properties of pixels lined up in the horizontal direction in the image before image processing.

Let us say that the gradation of the input image signal d1 has been transformed by the image processing device 10. For example, let us say this image processing results in an increase in the brightness (gradation) in only the section Z1 from the pixel positions P1 to P3. The curve C2 plots the gradation properties after this image processing has been performed by the image processing device 10.

In curve C2, continuity with the regions outside the section Z1 is maintained (continuity of the graph at pixel positions P1 and P3 is maintained), but in the section Z2 from pixel positions P2 to P3, the gradation of the pixels adjacent in the horizontal direction within the image is inverted (the size relationship among the gradations is inverted).

This inversion in gradation order can occur when the image processing device 10 creates a new profile by extrapolating a plurality of profiles, for example.

The image processing system 200 of the invention detects the sections in which the gradation order has been inverted. That is, it detects the pixels of the section Z2. Additionally, it displays a preview of the pixels of section Z2 using a transformation color that is easily recognized by the user.

The user therefore can easily recognize the sections that have the potential to be displayed unnaturally due to image processing. The user can note this preview display and simultaneously adjust the degree of image processing by the image processing device 10. That is, the user can adjust the degree of image processing so that the transformation color is no longer displayed while confirming the preview display. In this case, the user can perform image processing so that the brightness is raised but the gradation order is not inverted. As a result, the user can perform image processing with the suitable gradation properties shown by curve C3, for example.

It should be noted that for the sake of description brevity, the above description was made with reference to the gradation properties in the horizontal direction only. However, as shown in FIG. 15, the processing region interior reprocessing portion 201 detects the gradation order in the vertical and oblique directions as well. The image processing system 200 therefore can perform image processing with those gradation properties expressed by curves in a three-dimensional space, that achieve the goal of the image processing but also do not invert the gradation order.

Modified Examples (1)

In the foregoing embodiment, the image processing system 200 is characterized in that it reprocesses a section within the region that has been image processed. The following is a description of a system that is characterized in that it reprocesses a section that is outside the region that has been image processed.

In general, conventional image processing devices have the problem that the image-processed region is not easy to identify. Accordingly, it is an object of the invention to provide a system with which the image-processed region can be identified easily. Specifically, one means for achieving this goal is to express the region outside the region that has been subjected to image processing by the image processing device 10 in a predetermined transformation color or in gray scale. This allows the region that has been image processed to be identified easily.

Configuration and Action of Modified Example (1)

Figure 17:
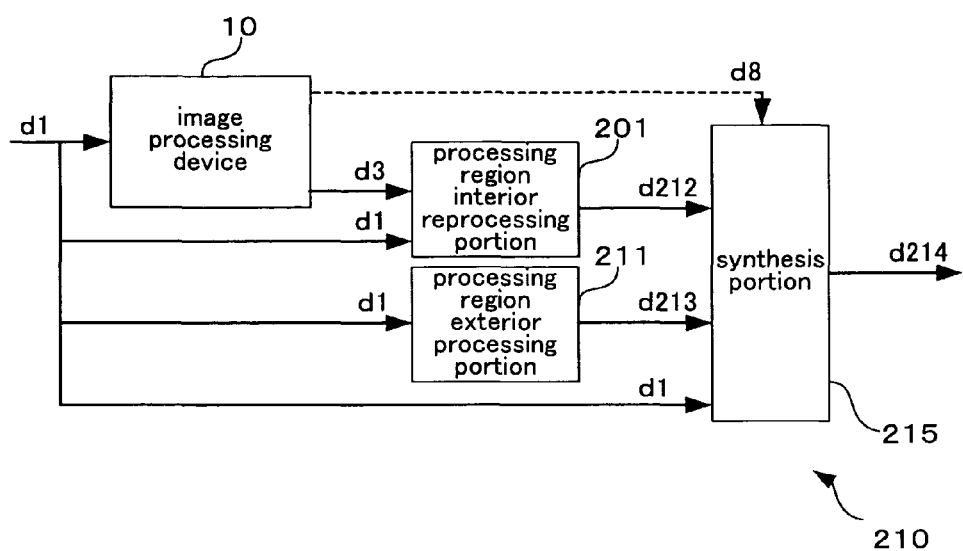
FIG. 17 is a block diagram for describing the basic configuration of the image processing system 210 (seventh embodiment).

FIG. 17 shows an image processing system 210 serving as a modified example. In FIG. 17, the sections that have the same function as those of the image processing system 200 shown in FIG. 13 are assigned the same reference numerals, and will not described. The following description focuses on a processing region exterior processing portion 211 and a synthesis portion 215, which are features characteristic of the image processing system 210.

The image processing system 210 is made of an image processing device 10 that performs image processing of an input signal d1, a processing region interior reprocessing portion 201 that outputs a region interior processing signal d212 based on the input signal d1 and an output signal d3, which is the output of the image processing device 10, a processing region exterior processing portion 211 that outputs a region exterior processing signal d213 based on the input signal d1, and a synthesis portion 215 that selects the region interior processing signal d212 and the region exterior processing signal d213 for each pixel and outputs a preview display signal d214. It should be noted that the image processing device 10 and the processing region interior reprocessing portion 201 have the same functions as those described using FIG. 13. The region interior processing signal d212 is thus the same signal as the preview display signal d202 of FIG. 13.

It should be noted that the configuration of this modified example is not limited to this, and as mentioned in the above embodiment, other image processing devices can also be used. Further, as mentioned in the above embodiment, the signal that is input is not limited to the input signal d1.

(Processing Region Exterior Processing Portion 211)

The processing region exterior processing portion 211 creates a signal for clearly indicating the region outside the region that has been subjected to image processing.

Specifically, the processing region exterior processing portion 211 functions as a brightness creation portion and processes the input signal d1 sequentially for each pixel to create a luminance signal for each pixel.

It should be noted that the operation of the processing region exterior processing portion 211 is not limited to this. Specifically, it can also function as a same color transformation portion that transforms the input signal d1 into any one color of red, blue, or green, for example (that is, only outputs that color component).

(Synthesis Portion 215)

Figure 18:
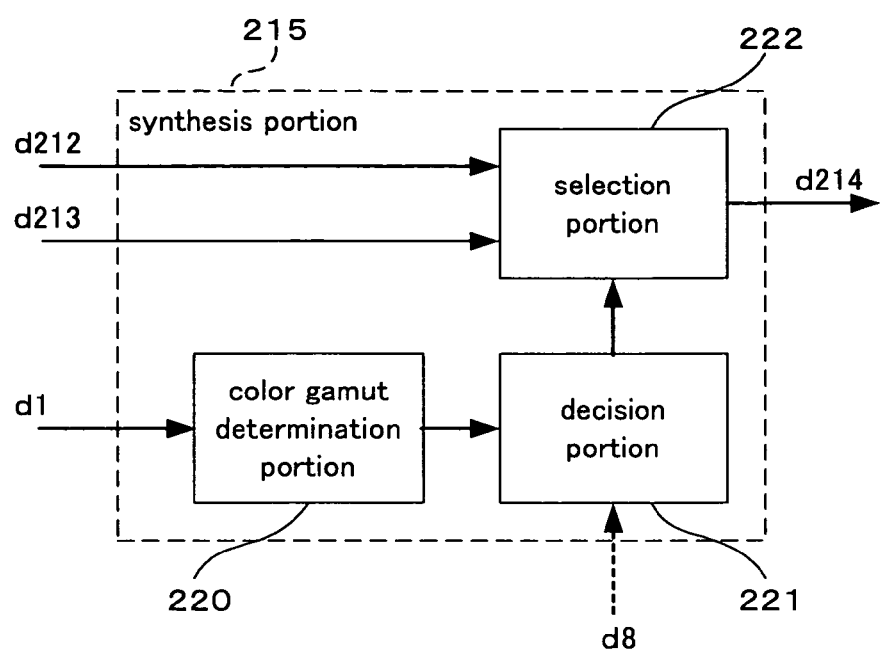
FIG. 18 is a block diagram for describing the structure of the synthesis portion 215 (seventh embodiment).

The configuration and the action of the synthesis portion 215 are described next. FIG. 18 shows the configuration of the synthesis portion 215.

The synthesis portion 215 is made of a color gamut determination portion 220, a decision portion 221, and a selection portion 222.

The color gamut determination portion 220 processes the input signal d1 for each pixel to determine the color gamut included in each pixel. The decision portion 221 decides whether or not pixels should be subjected to image processing based on the color gamut determination portion 220 and the target processing degree d8 that is obtained from the processing degree setting portion 18 (see FIG. 2) of the image processing device 10. The selection portion 222 outputs a preview display signal d214 that clearly shows the region outside of the region that has been subjected to image processing based on the results of the decision by the decision portion 221.

The operations of the portions of the synthesis portion 215 are described in detail below.

The color gamut determination portion 220 obtains the input signal d1 that is input for each pixel and determines the color gamut that includes the input pixel. Specifically, the color gamut determination portion 220 obtains the data of a plurality of color gamuts, and more specifically, obtains the data of the color gamuts corresponding to memory color such as blue sky, green foliage, or skin tone, which are stored in advance on a memory or the like that is not shown, and from the values of the color components (for example, RGB) of the input pixel, determines the color gamut to which the input pixel belongs. The color gamut determination portion 220 then adds the result of this determination to that pixel and outputs the result. Specifically, for each pixel it outputs information indicating a color gamut such as "blue sky," "green foliage," or "skin tone."

The data of the color gamuts stored in the memory, for example, are expressed as a group of values of the color components (for example, RGB) that fall within each color gamut, and are expressed as regions in a three-dimensional RGB space. The color gamut determination portion 220 obtains each color component of the input signal d1 and determines which color gamut (region in three-dimensional RGB space) that color component belongs to. Specifically, the data of the color gamuts are stored as the data of a plurality of coordinates that represent curves within a three-dimensional space that indicate the boundary between inner side and the outer side of the color gamut, and the color gamut determination portion 220 determines whether or not each color component of the input signal d1 falls within that space defined by those coordinate data. It should be noted that the data format of the color gamuts is not limited to this format, and the data can also be found through a computational expression. For example, it is also possible to calculate (L, a, b) from the input signal d1 and then from a and b find the hue and vividness in the a-b plane. Regions such as "blue sky," "green foliage" and "skin tone" are defined by the range of the hue, vividness, and brightness (L), and whether or not the hue, vividness, and brightness that have been found, are within each color gamut is found by comparing those values with a predetermined threshold value (boundary value). The result of this determination is then used as the color gamut data.

The decision portion 221 obtains the target processing degree d8 from the processing degree setting portion 18 of the image processing device 10. The target processing degree d8 includes information relating to which color gamut has been adjusted, as discussed in [First Embodiment] <Modified Examples> (2). The decision portion 221 decides whether or not the information indicating the color gamut that has been obtained for each pixel from the color gamut determination portion 220 matches the information relating to the adjusted color gamut shown by the target processing degree d8, and outputs the result of this decision to the selection portion 222. As the decision result, the decision portion 221 for example outputs the value 1 if the two match and outputs the value 0 if they do not match.

The selection portion 222 selects either the region exterior processing signal d213 or the region interior processing signal d212 obtained for each pixel, and outputs the result of this selection as the preview display signal d214. Here, this selection is performed based on the results of the decision by the decision portion 221. Specifically, if the decision result is the value 1 (if the color gamut of the target pixel matches the color gamut that has been adjusted), then the selection portion 222 selects the region interior processing signal d212. On the other hand, if the decision result is the value 0 (if the color gamut of the target pixel does not match the adjusted color gamut), then the selection portion 222 selects the region exterior processing signal d213.

Effect of Modified Example (1)

The result of the above is that the region that has not been subjected to image processing can be made colorless (or a single color). It is therefore easy to confirm the regions that have been subjected to image processing.

Further, the image processing system 210 is provided with a processing region interior reprocessing portion 201. The image processing system 210, like the image processing system 200 described with FIG. 13, thus can clearly display, through the preview display, those portions in the region subjected to image processing that may be displayed unnaturally.

Modified Examples and Modified Example (1)

(1-1)

The image processing system 210 shown in FIG. 17 was described as being provided with the processing region interior reprocessing portion 201. The processing region interior reprocessing portion 201 is not absolutely necessary, however. If the processing region interior reprocessing portion 201 is not provided, then the selection portion 222 of the synthesis portion 215 selectively outputs the output signal d3 and the region exterior processing signal d213 in the same manner as discussed above.

In this case as well, the user can easily confirm which sections have been subjected to image processing.

(1-2)

The synthesis portion 215 is not limited to the above structure.

Figure 19:
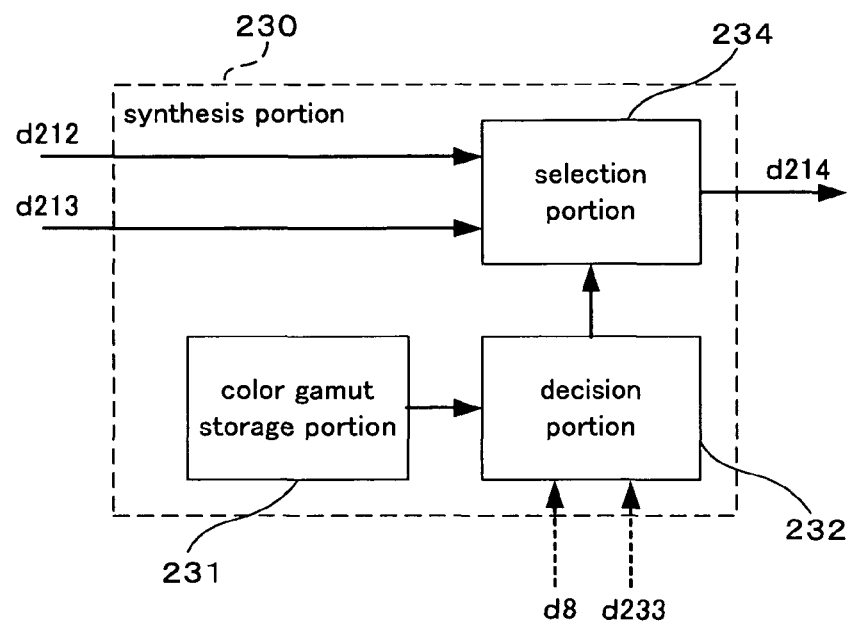
FIG. 19 is a block diagram for describing the structure of the synthesis portion 230 (seventh embodiment).

A synthesis portion 230 serving as a modified example of the synthesis portion 215 is shown in FIG. 19.

The synthesis portion 230 is made of a color gamut storage portion 231, a decision portion 232, and a selection portion 234.

The color gamut storage portion 231 stores information on the color gamut that the pixel falls in for each pixel of the input signal d1. More specifically, it stores information on the color gamut to which each pixel belongs (for example, information indicating a color gamut such as "blue sky," "green foliage" or "skin tone") in the order that the information of each pixel is obtained.

The decision portion 232 obtains the color gamut information of each pixel stored on the color gamut storage portion 231, the target processing degree d8, and a processing region signal d233. The decision portion 232 obtains the target processing degree d8 from the processing degree setting portion 18 of the image processing device 10. The target processing degree d8 includes information relating to which color gamut has been adjusted, as discussed in [First Embodiment] <Modified Examples> (2). The decision portion 232 also obtains the processing region signal d233. The processing region signal d233 is information that is set through an input portion or the like (not shown), and is information that specifies a region in the preview display that the user would like to confirm the image processing that has been performed. For example, the processing region signal d233 can be a signal that includes coordinates that define a region or a signal that indicates one of a plurality of image regions obtained by partitioning the image into a plurality of image regions.

For each pixel of the input signal d1, the decision portion 232 decides whether or not the information of the color gamut of that pixel matches the information relating to the adjusted color gamut that is shown by the target processing degree, and also decides whether or not that pixel position is included in the processing region signal d233.

The decision portion 232 outputs the value 1 if the result of both decisions is yes, and outputs the value 0 if the result of either one of those decisions is no.

The selection portion 234 selects either the region exterior processing signal d213 or the region interior processing signal d212 obtained for each pixel, and outputs the result of this selection as the preview display signal d214. Here, this selection is performed based on the results of the decision by the decision portion 232. Specifically, if the decision result is the value 1 (if the color gamut of the target pixel matches the adjusted color gamut and the pixel position of the target pixel is included in the region that the user would like to confirm), then the selection portion 234 selects the region interior processing signal d212. On the other hand, if the decision result is the value 0 (if the color gamut of the target pixel does not match the adjusted color gamut, or if the pixel position of the target pixel is not included in the region that the user would like to confirm), then the selection portion 234 selects the region exterior processing signal d213.

(2)

The processing region interior reprocessing portion 201 that was described in the above embodiment and in Modified Example (1) is not limited to the above configuration. As long as the processing region interior reprocessing portion 201 has the function of clearly indicating regions that have the potential to be displayed unnaturally due to image processing, it can also have the following configuration.

(Configuration and Action)

Figure 20:
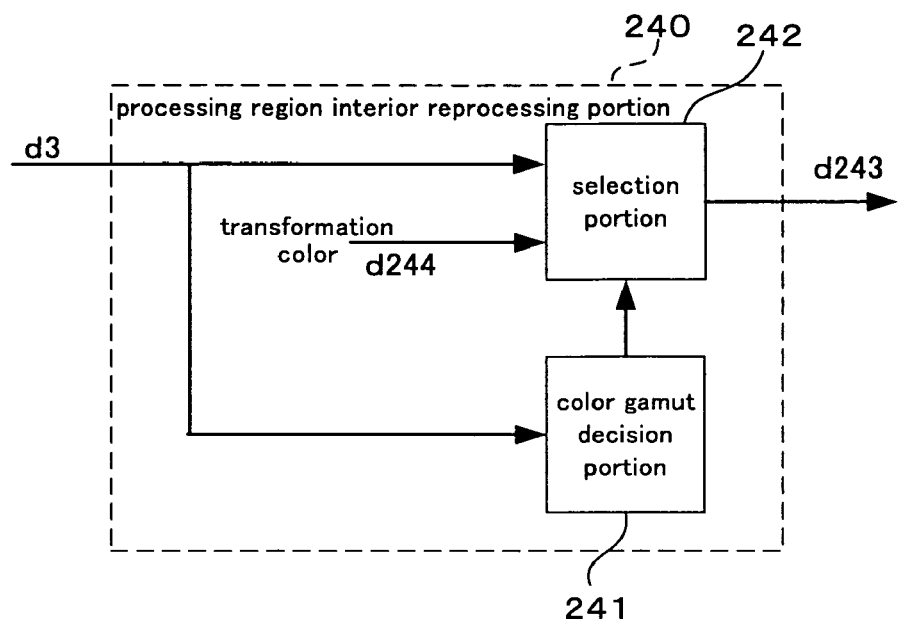
FIG. 20 is a block diagram for describing the structure of the processing region interior reprocessing portion 240 (seventh embodiment).

FIG. 20 is a block diagram for describing the structure of a processing region interior reprocessing portion 240, which is a modified example of the processing region interior reprocessing portion 201. The processing region interior reprocessing portion 240 detects whether or not a color gamut of the output signal d3 falls into a color gamut that can be displayed by the display device for displaying the output signal d3, and if the color gamut of the output signal d3 exceeds the color gamut of the display device, then the processing region interior reprocessing portion 240 outputs a preview display signal d243 that clearly indicates the pixels of the exceeding region to the user in a transformation color.

The processing region interior reprocessing portion 240 is made of a color gamut decision portion 241 and a selection portion 242.

The color gamut decision portion 241 decides whether or not the color gamut of the output signal d3 exceeds the color gamut of the display device. The selection portion 242 outputs a preview display signal d243 that clearly indicates the portions of the output signal d3 that exceed the color gamut of the display device, based on the result of the decision by the color gamut decision portion 241.

These portions are described in further detail below.

The color gamut decision portion 241 obtains the output signal d3 for each pixel. The color gamut decision portion 241 pre-stores information relating to the color gamut that can be displayed by the display device (for example, printer or monitor) for displaying the output signal d3, that is, the output of the image processing device 10. The color gamut decision portion 241 then decides whether or not the pixel value of each pixel of the output signal d3 falls within the color gamut of the display device, and outputs the result of this decision to the selection portion 242. As the result of this decision, the color gamut decision portion 241 for example outputs the value 1 if the pixel value of the output signal d3 is included in the color gamut of the display device, and outputs the value 0 if the pixel value of the output signal d3 does not fall within the color gamut of the display device. These values are merely examples, however, and it is necessary only that the signal is capable of distinguishing between the two cases. It should be noted that it is also possible for the color gamut decision portion 241 to obtain the color gamut of the display device by accessing a connected memory (not shown), for example.

The selection portion 242 receives the output signal d3 and a transformation color signal d244 that is a predetermined pixel value stored on a memory or the like, which is not shown, and that indicates a predetermined transformation color as input, selects either the output signal d3 or the transformation color signal d244, and then outputs the result of this selection as the preview display signal d243. Here, the selection portion 242 makes this selection through the procedure described below. That is, if 1 is the value of the signal that is obtained from the color gamut decision portion 241 (if the pixel value of the output signal d3 is included in the color gamut of the display device), then the output signal d3 is selected. On the other hand, if 0 is the value of the signal that is obtained from the color gamut decision portion 241 (if the pixel value of the output signal d3 is not included in the color gamut of the display device), then the transformation color signal d244 is selected. That is, the selection portion 242 outputs the value of the target pixel after image processing (the output signal d3) as the preview display signal d202 if the color gamut of the target pixel after image processing is included in the color gamut that can be displayed by the display device, and outputs the transformation color signal d244, which indicates a predetermined transformation color, as the preview display signal instead of the value of the target pixel after image processing if the color gamut of the target pixel after image processing is not included in the color gamut that can be displayed by the display device.

(Effects)

The processing region interior reprocessing portion 240 allows the user to view a preview display and readily confirm those portions that have the potential to be displayed unnaturally by the display device. More specifically, the user can recognize in advance those portions that have the potential to be displayed unnaturally of colors of the image displayed by the printer or monitor.

Additionally, the user can avoid such unnatural displays by adjusting the degree of processing by the image processing device 10 while viewing the preview display.

Modified Example

It should be noted that if the output signal d3 is an image signal that has been obtained by compressing the color gamut of the input signal d1, then it is also possible for the color gamut decision portion 241 to obtain the input signal d1 in lieu of the output signal d3, and then perform a decision on the pixels whose color gamut has been compressed based on the pixel values of the input signal d1.

At this time, the color gamut decision portion 241 already stores information relating to the color gamut that has been subjected to color gamut compression. The information relating to the color gamut that has been subjected to color gamut compression is created based on information relating to the color gamut that can be displayed by the display device (printer or monitor, for example) for displaying the output signal d3. Here, color gamut compression is performed when the color gamut of the input signal d1 exceeds the color gamut of the display device, and is the creation of an output signal d3 in which the color gamut of the input signal d1 has been compressed in advance down to the color gamut of the display device in order to prevent pixel values from being clipped by the display device when that image is displayed. That is, when the color gamut of the input signal d1 is compressed, the color of the pixels of the input signal d1 whose pixel value exceeds the color gamut that can be displayed by the display device or whose pixel value is near the border of the color gamut that can be displayed by the display device is transformed.

The color gamut decision portion 241 stores information on the color-transformed color gamut that is created in advance based on the color gamut of the display device (hereinafter called color gamut compression information). The color gamut decision portion 241 decides whether or not the pixel values of the target pixels of the input signals d1 input one by one for each pixel fall within the color gamut indicated by the color gamut compression information. The selection portion 242 (see FIG. 20) then selectively outputs either the output signal d3 or the transformation color signal d244 based on the results of the decisions by the color gamut decision portion 241. More specifically, the selection portion 242 outputs the transformation color signal d244 as the preview display signal d243 if the target pixel falls within the color gamut indicated by the color gamut compression information (the color of the target pixel is transformed by color gamut compression). Conversely, the selection portion 242 outputs the output signal d3 as the preview display signal d243 if the target pixel does not fall within the color gamut indicated by the color gamut compression information (the color of the target pixel is not transformed by color gamut compression).

Thus, the portions of the output signal d3 whose color gamut has been compressed can be shown clearly through the preview display. Further, the user can easily confirm whether or not color gamut compression has been performed appropriately by viewing the preview display. The user can also adjust the degree of processing by the image processing device 10 to perform appropriate color gamut compression while viewing the preview display.

It should be noted that the decision by the color gamut decision portion 241 can also be performed using the pixel values of the output signal d3. That is, when color gamut compression has been performed, there is a one-to-one relationship between the pixel values before color gamut compression and the pixel values after color gamut compression, and thus the pixel values of the pixels of the output signal d3 can be used to determine whether or not that pixel has been subjected to color gamut compression.

It should be noted that although the pixels whose color gamut has been compressed were displayed in a transformation color, they can also be displayed by other means. For example, they can also be displayed as characters or pictures.

(3)

The image processing system described in the above embodiment and its Modified Examples (1) and (2) can further include a display switching function such as that described below.

The display switching function is a function for switching the preview display between the output signal d3 and either the input signal d1 or the preview display signal d202 (see FIG. 13), d214 (see FIG. 17), or d243 (see FIG. 20) described above.

Figure 21:
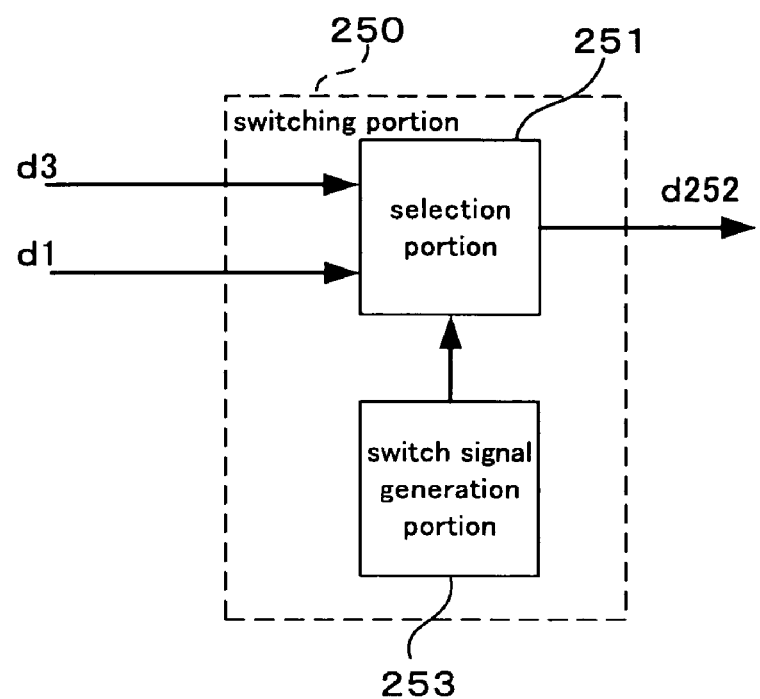
FIG. 21 is a block diagram for describing the structure of the switching portion 250 (seventh embodiment).

A switching portion 250 for switching the display between the input signal d1 and the output signal d3 is described below using FIG. 21.

The switching portion 250 is provided with a selection portion 251 that receives the input signal d1 and the output signal d3 as input and selectively outputs one of the two, and a switch signal generation portion 253 that furnishes the selection portion 251 with a switch timing.

The input signal d1 is stored in a RAM that is not shown. The output signal d3 also is stored in a RAM that is not shown. The selection portion 251 reads either the input signal d1 or the output signal d3 stored in the RAMs at the switch timing generated (every few seconds, for example) by the switch signal generation portion 253 and outputs that signal as a preview display signal d252.

The display thus can be switched between the input signal d1 and the output signal d3. The user therefore can compare the images before and after image processing.

If this same configuration is used to switch the preview display between the output signal d3 and the preview display signal d202 (see FIG. 13), d214 (see FIG. 17), or d243 (see FIG. 20), then those portions that have the potential to be displayed unnaturally are displayed blinking. Those portions that have the potential to be displayed unnaturally thus can be easily noted beforehand. It is also possible to easily asses whether or not the degree of unnaturalness of those portions is permissible.

It is also possible to provide the switching portion 250 in place of the processing region interior reprocessing portion 201 in FIG. 13 for example, or to further provide the structure shown in FIG. 13 with the switching portion 250.

It should be noted that the switching operation described above can be stopped if the adjustment scale has not been changed for a predetermined period of time, or if adjustment of another color has started, in the image processing device 10.

(4)

In the image processing systems described in the above embodiment and in the above modified examples (1) through (3), it is also possible for a restriction to be placed on the adjustment range of the processing degree setting portion 18 of the image processing device 10 based on the results of the comparison by the gradation order comparison portion 207 of the processing region interior reprocessing portion 201 or the results of the decision output by the color gamut decision portion 241 of the processing region interior reprocessing portion 240, for example.

Specifically, if portions of the image-processed signal (output signal d3) that have the potential to be displayed unnaturally are detected in response to actuation of the adjustment scale of the image processing device 10 (see FIG. 2) in a certain direction, then further actuation of the adjustment scale in that direction is restricted. It should be noted that the portions of the image-processed signal (output signal d3) that have the potential to be displayed unnaturally are detected from the results of the comparison by the gradation order comparison portion 207 or the results of the decision by the color gamut decision portion 241.

Thus, the user can suitably perform image processing without worrying whether or not the output signal d3 will be displayed unnaturally.

[Other Implementations]

(1)

In the foregoing embodiments, the profile creation execution portion, the matrix creation execution portion, the control portion, or the color processing execution portion can be achieved by software or hardware. If achieved by software, then that program is stored on a storage device such as a hard disk, RAM, ROM, or memory card in a device provided in or connected to a machine that handles images, such as a computer, a digital camera, a portable telephone, a PDA, or a digital television, and is a program for executing color processing of images. The program can be provided through a storage medium such as a CD-ROM or over a network.

It is also possible for the profile creation execution portion, the matrix creation execution portion, the control portion, or the color processing execution portion, for example, to be contained within an LSI. By containing them in an LSI, different processing is achieved through base profiles, and thus it is not necessary to design an LSI for each instance where different processing is to be achieved.

It is also possible for the functional blocks described in the foregoing embodiments using the drawings to be individually incorporated into single chips, or for a single chip to incorporate some or all of those functions, through semiconductor device such as an LSI. At this time, the base profile group storage portion and the profile RAM, for example, can be connected to the outside as separate units. It is also possible for the processing degree setting portion to be connected to the outside as a separate unit.

It should be noted that here reference is made to an LSI, but depending on the degree of integration, it may be referred to as IC, system LSI, super LSI, or ultra LSI.

Further, the manner in which the integrated circuit is achieved is not limited to an LSI, and it is also possible to use a dedicated circuit or a general purpose processor. After LSI manufacturing, it is also possible to employ a programmable FPGA (Field Programmable Gate Array) or a reconfigurable processor in which the connections and settings of the circuit cells within the LSI can be reconfigured.

Further, if other technologies that improve upon or are derived from semiconductor technologies enable integrated circuit technology to replace LSIs, then naturally it is also possible to integrate the functional blocks using that technology. Biotechnology applications are one such foreseeable example.

(2)

In the foregoing embodiment, the input signal d1 and the image signal d2 can be still images or moving images.

(3)

In the foregoing embodiment, the image signal values are expressed as coordinates of a color space using the three base colors R, G, and B, but the effects of the present invention are not limited to instances where data of this color space are used. For example, the data can also be of a CMY-type color space or a Lab-type color space.

The effects of the present invention may also find use outside of color processing that involves a three-dimensional color space. That is, the effects of the present invention are not dependant on the dimension of the color space that is involved.

(4)

An overall effect of the foregoing embodiment is that the degree of processing such as display color transformation, color gamut transformation, and memory color correction can be adjusted freely. For example, it is possible to perform color processing that corresponds with the environment of the output device that will output the image signal after color processing. More specifically, it is possible to display the color-processed image signal on a monitor taking into account the ambient light of the surroundings, as well as to print out the color-processed image signal on a printer taking into account the paper quality. Also, in display color transformation and memory color correction, etc., it is possible to perform color processing that matches the preferences of each person who will view the image.

In addition to these effects, in the foregoing embodiments it is not necessary to have a large number of lookup tables each having a different degree of color processing, and this allows the storage capacity of the memory etc. for storing the lookup tables to be reduced.

INDUSTRIAL APPLICABILITY

The image processing device according to the invention has the effect of allowing the color processing to be adjusted with ease, and is useful as an image processing device or a device that includes an image processing device.

What is claimed is:

1. An image processing device comprising:
a processing degree setting unit that sets a target degree for color processing with regard to at least two properties of a plurality of properties of an image signal, as a single target processing degree;
a processing coefficient group creation unit that creates a processing coefficient group for performing color processing of the single target processing degree, based on the single target processing degree set by the processing degree setting unit and a plurality of base coefficient groups that perform the color processing of the single target processing degree to differing degrees, wherein the plurality of base coefficient groups are created in advance; and
a color processing execution unit that performs the color processing of the single target processing degree with respect to the image signal using the processing coefficient group created by the processing coefficient group creation unit,
wherein the color processing of the single target processing degree is memory color correction,
wherein the plurality of base coefficient groups do not change with respect to the image signal,
wherein the plurality of base coefficient groups have conversion characteristics such that a point in a color space according to the image signal after the memory color correction is in a predetermined region in the color space, and
wherein the processing degree setting unit sets: a default value for the single target processing degree, the default value being a value not at an edge of the predetermined region in the color space; a first boundary value, which is an upper limit value for the single target processing degree; and a secondary boundary value, which is a lower limit value for the single target processing degree,
wherein the processing coefficient group creation unit creates: a default processing coefficient group corresponding to the default value; a first processing coefficient group corresponding to the first boundary value; and a second processing coefficient group corresponding to the second boundary value,
wherein, in a case when the single target processing degree is a value in a range between the default value of the single target processing degree and the first boundary value, the processing coefficient group creation unit creates the processing coefficient group for performing the memory color correction by interpolating the default processing coefficient group and the first processing coefficient group based on the single target processing degree, and wherein, in a case when the single target processing degree is a value in a range between the default value of the target degree and the second boundary value, the processing coefficient group creation unit creates the processing coefficient group for performing the memory color correction by interpolating the default processing coefficient group and the second processing coefficient group based on the single target processing degree.

2. The image processing device according to claim 1, wherein the processing coefficient group creation unit creates the processing coefficient group by interpolating or extrapolating the plurality of base coefficient groups based on the single target processing degree.

3. The image processing device according to claim 1, wherein the plurality of properties include a hue, a vividness, and a brightness of the image signal.

4. The image processing device according to claim 1, wherein the processing degree setting unit sets a correction trend of the memory color correction as the single target processing degree, and wherein the processing coefficient group creation unit creates the processing coefficient group by interpolating or extrapolating the plurality of base coefficient groups that perform the memory color correction with different correction trends based on the single target processing degree.

5. The image processing device according to claim 1, wherein the processing degree setting unit sets a correction strength of the memory color correction as the single target processing degree, and wherein the processing coefficient group creation unit creates the processing coefficient group by interpolating or extrapolating a base coefficient group that performs the memory color correction of a predetermined correction strength and a base coefficient group with which the memory color correction is not performed, based on the single target processing degree.

6. The image processing device according to claim 1, wherein the plurality of base coefficient groups are a plurality of base matrix data whose size corresponds to the number of the plurality of properties of the image signal, and wherein the color processing execution unit performs a matrix computation on the image signal using processing matrix data created by the processing coefficient group creation unit.

7. The image processing device according to claim 6, wherein the processing coefficient group creation unit creates the processing matrix data by interpolating or extrapolating the plurality of base matrix data based on the single target processing degree.

8. The image processing device according to claim 1, wherein the plurality of base coefficient groups are a plurality of base lookup tables that store values corresponding to the values of the image signal after a previous memory color correction has been performed, and wherein the color processing execution unit performs the memory color correction on the image signal using a processing lookup table created by the processing coefficient group creation unit.

9. The image processing device according to claim 8, wherein the processing coefficient group creation unit creates the processing lookup table by interpolating or extrapolating the plurality of base lookup tables based on the single target processing degree.

10. The image processing device according to claim 1, wherein the processing degree setting unit includes: a first processing degree setting unit that sets a first target processing degree, which is a target for a correction trend of the memory color correction; and a second processing degree setting unit that sets a second target processing degree, which is a target for a correction strength of the memory color correction, and wherein the processing coefficient group creation unit creates the processing coefficient group by interpolating or extrapolating the plurality of base coefficient groups that perform the memory color correction at different correction trends, based on the first processing degree and the second processing degree.

11. The image processing device according to claim 1, wherein the processing coefficient group creation unit creates the processing coefficient group by changing only a specific section of the plurality of base coefficient groups.

12. The image processing device according to claim 11, wherein the specific section of the plurality of base coefficient groups is a section that is determined by the processing degree setting unit.

13. The image processing device according to claim 11, wherein the specific section of the plurality of base coefficient groups is a section of the plurality of base coefficient groups that gives a transformation coefficient for a predetermined memory color.

14. An image processing method comprising the steps of:
(a) setting, using a processor, a target degree for color processing with regard to at least two properties of a plurality of properties of an image signal, as a single target processing degree;
(b) creating a processing coefficient group that performs color processing of the single target processing degree, based on the single target processing degree that is set in the step (a) and a plurality of base coefficient groups that perform the color processing of the single target processing degree to differing degrees, wherein the plurality of base coefficient groups are created in advance; and
(c) performing the color processing of the single target processing degree with respect to the image signal using the processing coefficient group that is created in the step (b), wherein the color processing of the single target processing degree is memory color correction, wherein the plurality of base coefficient groups do not change with respect to the image signal, wherein the plurality of base coefficient groups have conversion characteristics such that a point in a color space according to the image signal after the memory color correction is in a predetermined region in the color space, and wherein the setting the target degree for color processing includes setting: a default value for the single target processing degree, the default value being a value not at an edge of the predetermined region in the color space; a first boundary value, which is an upper limit value for the single target processing degree; and a secondary boundary value, which is a lower limit value for the single target processing degree, wherein the creating the processing coefficient group that performs color processing of the single target processing degree includes creating: a default processing coefficient group corresponding to the default value; a first processing coefficient group corresponding to the first boundary value; and a second processing coefficient group corresponding to the second boundary value, wherein, in a case when the single target processing degree is a value in a range between the default value of the single target processing degree and the first boundary value, the processing coefficient group for performing the memory color correction is created by interpolating the default processing coefficient group and the first processing coefficient group based on the single target processing degree, and wherein, in a case when the single target processing degree is a value in a range between the default value of the target degree and the second boundary value, the processing coefficient group for performing the memory color correction is created by interpolating the default processing coefficient group and the second processing coefficient group based on the single target processing degree.

15. A non-transitory computer-readable storage medium having stored thereon an image processing program that performs color processing of an image signal through a computer, wherein when executed, the image processing program causes the computer to perform an image processing method comprising the steps of:

(a) setting, using a processor, a target degree for the color processing with regard to at least two properties of a plurality of properties of the image signal, as a single target processing degree;

(b) creating a processing coefficient group that performs color processing of the single target processing degree, based on the single target processing degree set in the step (a) and a plurality of base coefficient groups that perform the color processing of the single target processing degree to differing degrees, the plurality of base coefficient groups being created in advance; and (c) performing the color processing of the single target processing degree with respect to the image signal using the processing coefficient group created in the step (b), wherein the color processing of the single target processing degree is memory color correction, and wherein the plurality of base coefficient groups do not change with respect to the image signal, wherein the plurality of base coefficient groups have conversion characteristics such that a point in a color space according to the image signal after the memory color correction is in a predetermined region in the color space, and wherein the setting the target degree for color processing includes setting: a default value for the single target processing degree, the default value being a value not at an edge of the predetermined region in the color space; a first boundary value, which is an upper limit value for the single target processing degree; and a secondary boundary value, which is a lower limit value for the single target processing degree, wherein the creating the processing coefficient group that performs color processing of the single target processing degree includes creating: a default processing coefficient group corresponding to the default value; a first processing coefficient group corresponding to the first boundary value; and a second processing coefficient group corresponding to the second boundary value, wherein, in a case when the single target processing degree is a value in a range between the default value of the single target processing degree and the first boundary value, the processing coefficient group for performing the memory color correction is created by interpolating the default processing coefficient group and the first processing coefficient group based on the single target processing degree, and wherein, in a case when the single target processing degree is a value in a range between the default value of the target degree and the second boundary value, the processing coefficient group for performing the memory color correction is created by interpolating the default processing coefficient group and the second processing coefficient group based on the single target processing degree.

16. An integrated circuit device comprising:

a processing degree setting portion that sets a target degree for color processing with regard to at least two properties of a plurality of properties of an image signal, as a single target processing degree;

a processing coefficient group creation portion that creates a processing coefficient group for performing color processing of the single target processing degree, based on the single target processing degree set by the processing degree setting portion and a plurality of base coefficient groups that perform the color processing of the single target processing degree to differing degrees, wherein the plurality of coefficient groups are created in advance; and a color processing execution portion that performs color processing of the single target processing degree with respect to the image signal using the processing coefficient group created by the processing coefficient group creation portion, wherein the color processing of the single target processing degree is memory color correction, and wherein the plurality of base coefficient groups do not change with respect to the image signal, wherein the plurality of base coefficient groups have conversion characteristics such that a point in a color space according to the image signal after the memory color correction is in a predetermined region in the color space, and wherein the processing degree setting portion sets: a default value for the single target processing degree; a first boundary value, the default value being a value not at an edge of the predetermined region in the color space, which is an upper limit value for the single target processing degree; and a secondary boundary value, which is a lower limit value for the single target processing degree, wherein the processing coefficient group creation portion creates: a default processing coefficient group corresponding to the default value; a first processing coefficient group corresponding to the first boundary value; and a second processing coefficient group corresponding to the second boundary value, wherein, in a case when the single target processing degree is a value in a range between the default value of the single target processing degree and the first boundary value, the processing coefficient group creation portion creates the processing coefficient group for performing the memory color correction by interpolating the default processing coefficient group and the first processing coefficient group based on the single target processing degree, and wherein, in a case when the single target processing degree is a value in a range between the default value of the target degree and the second boundary value, the processing coefficient group creation portion creates the processing coefficient group for performing the memory color correction by interpolating the default processing coefficient group and the second processing coefficient group based on the single target processing degree.

* * * * *